(12) United States Patent
Oba et al.

(10) Patent No.: US 8,100,207 B2
(45) Date of Patent: Jan. 24, 2012

(54) POWER OUTPUT APPARATUS, HYBRID VEHICLE HAVING THE SAME, AND METHOD OF CONTROLLING THE POWER OUTPUT APPARATUS

(75) Inventors: Hidehiro Oba, Aichi-ken (JP); Hiroshi Katsuta, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 489 days.

(21) Appl. No.: 12/444,024

(22) PCT Filed: Oct. 19, 2007

(86) PCT No.: PCT/JP2007/070437
§ 371 (c)(1),
(2), (4) Date: Apr. 2, 2009

(87) PCT Pub. No.: WO2008/053721
PCT Pub. Date: May 8, 2008

(65) Prior Publication Data
US 2010/0113213 A1      May 6, 2010

(30) Foreign Application Priority Data
Oct. 31, 2006   (JP) .................................. 2006-296482

(51) Int. Cl.
*B60W 10/04* (2006.01)
(52) U.S. Cl. ............................. 180/65.285; 180/65.21
(58) Field of Classification Search .................. 180/245, 180/65.1, 65.21, 65.225, 65.23, 65.235, 65.28, 180/65.285, 65.6, 65.7, 69.6; 477/3; 320/132; 903/930; 701/22, 51
See application file for complete search history.

(56) References Cited

U.S. PATENT DOCUMENTS

| | | | | |
|---|---|---|---|---|
| 5,669,842 | A * | 9/1997 | Schmidt | 475/5 |
| 6,634,986 | B2 * | 10/2003 | Kima | 477/107 |
| 7,108,087 | B2 * | 9/2006 | Imai | 180/65.23 |
| 7,317,259 | B2 * | 1/2008 | Yamauchi | 290/40 C |
| 7,431,111 | B2 * | 10/2008 | Nada | 180/65.28 |
| 7,562,730 | B2 * | 7/2009 | Shimizu et al. | 180/65.23 |
| 7,736,265 | B2 * | 6/2010 | Yamamoto et al. | 477/3 |
| 7,885,737 | B2 * | 2/2011 | Hirata et al. | 701/22 |
| 7,931,102 | B2 * | 4/2011 | Katsuta et al. | 180/65.225 |
| 7,938,208 | B2 * | 5/2011 | Oba et al. | 180/65.225 |
| 2005/0054479 | A1 * | 3/2005 | Masterson et al. | 477/3 |
| 2007/0243966 | A1 * | 10/2007 | Holmes et al. | 475/5 |
| 2007/0255463 | A1 * | 11/2007 | Kikuchi | 701/22 |
| 2008/0300099 | A1 * | 12/2008 | Yamamoto et al. | 477/3 |

(Continued)

FOREIGN PATENT DOCUMENTS

JP        2000-326739 A      11/2000

(Continued)

*Primary Examiner* — J. Allen Shriver, II
*Assistant Examiner* — Brodie Follman
(74) *Attorney, Agent, or Firm* — Kenyon & Kenyon LLP

(57) ABSTRACT

The hybrid vehicle transfers power between the two motors, releases a coupling between one of the motors and the drive shaft, adjusts the rotation speed of one of the motors which is released from the coupling to the drive shaft by the transmission so as to enable drive source element connection, and connects the clutch as well as cranks the engine by either one or the other motor when the engine is started while the clutch is released, the engine is stopped, both the motors are coupled to the drive shaft as well as at least one of the motors is caused to output power.

15 Claims, 16 Drawing Sheets

U.S. PATENT DOCUMENTS

| | | | |
|---|---|---|---|
| 2008/0318730 A1* | 12/2008 | Endo | 477/52 |
| 2009/0146615 A1* | 6/2009 | Zillmer et al. | 322/23 |
| 2010/0012405 A1* | 1/2010 | Katsuta et al. | 180/65.22 |
| 2010/0029436 A1* | 2/2010 | Katsuta et al. | 477/5 |
| 2010/0032218 A1* | 2/2010 | Ideshio et al. | 180/65.225 |

FOREIGN PATENT DOCUMENTS

| | | |
|---|---|---|
| JP | 2003-106389 A | 4/2003 |
| JP | 2005-125876 A | 5/2005 |
| JP | 2005-155891 A | 6/2005 |
| JP | 2005-170227 A | 6/2005 |
| JP | 2005-297786 A | 10/2005 |

* cited by examiner

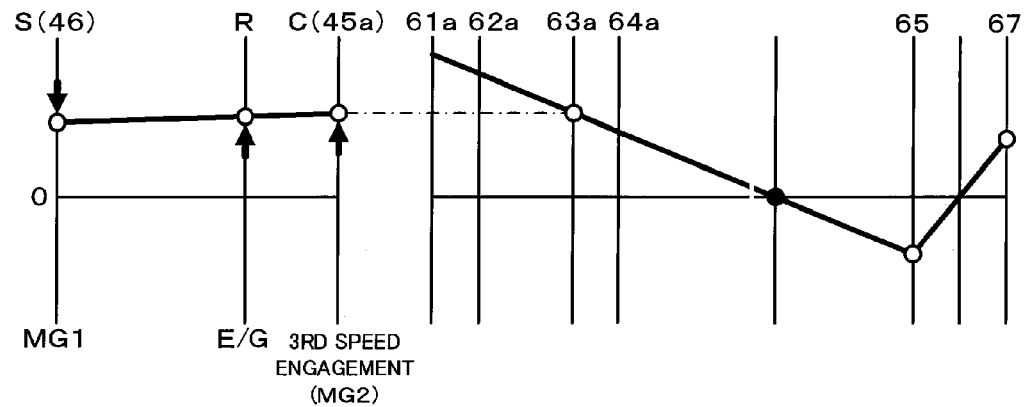
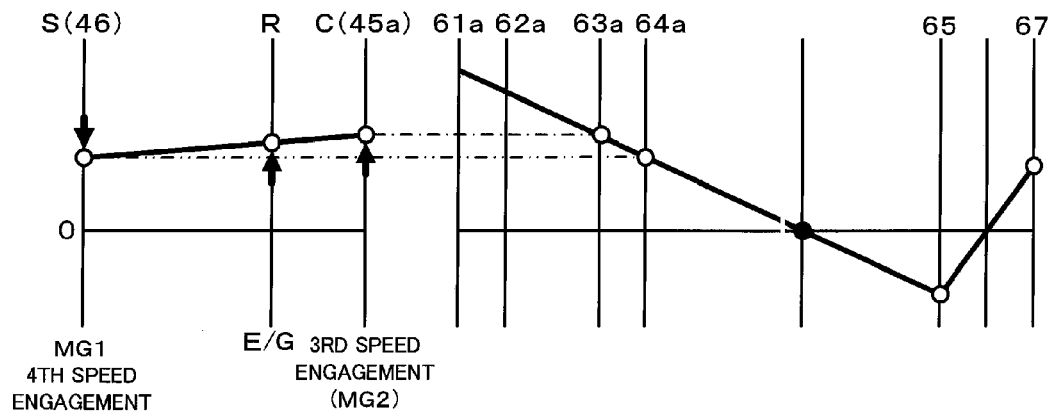

POWER OUTPUT APPARATUS, HYBRID VEHICLE HAVING THE SAME, AND METHOD OF CONTROLLING THE POWER OUTPUT APPARATUS

This is a 371 national phase application of PCT/JP2007/070437 filed 19 Oct. 2007, claiming priority to Japanese Patent Application No. JP 2006-296482 filed 31 Oct. 2006, the contents of which are incorporated herein by reference.

TECHNICAL FIELD

The present invention relates to a power output apparatus for outputting power to a drive shaft, a hybrid vehicle having the same, and a method of controlling the power output apparatus.

BACKGROUND ART

Conventionally, as such a power output apparatus, there has been known a power output apparatus including an internal combustion engine, two motors, a so-called ravigneaux planetary gear mechanism, a parallel shaft-type transmission capable of selectively coupling two output elements of the planetary gear mechanism to an output shaft (for example, see Patent Document 1). The power output apparatus is adapted for a front-wheel-drive vehicle, and the power output apparatus is configured such that the internal combustion engine is arranged transversely, as well as the rotating shafts of the internal combustion engine and the planetary gear mechanism, the two motors, and the parallel shaft-type transmission extend in parallel to each other. In addition, conventionally, there has been known a power output apparatus including a planetary gear device having an input element connected to an internal combustion engine and two output elements; and a parallel shaft-type transmission having a countershaft connected to each of the corresponding output elements of the planetary gear device (for example, see Patent Document 2). According to the power output apparatus, each of the two output elements of the planetary gear device is fixed to an inner periphery of a corresponding rotor in an electric drive section.

Patent Document 1: Japanese Patent Laid-Open No. 2005-155891
Patent Document 2: Japanese Patent Laid-Open No. 2003-106389

DISCLOSURE OF THE INVENTION

The power output apparatuses disclosed in the above individual Patent Documents can transmit power to an output shaft by stopping the internal combustion engine as well as changing the speed of the power output from one of the motors by a transmission. However, the above individual Patent Documents do not disclose in detail how to perform such a motor drive for outputting power only by the motor.

In view of this, an object of the present invention is to start the internal combustion engine by more properly outputting a demanded power to the drive shaft when the power is transmitted to the drive shaft by stopping the internal combustion engine as well as changing the speed of the power output from the motor by the transmission mechanism.

In order to achieve the above object, the power output apparatus and the hybrid vehicle in accordance with the present invention adopt the following means.

The present invention is directed to a power output apparatus for outputting power to a drive shaft. The power output apparatus includes: an internal combustion engine; a first motor capable of inputting and outputting power; a second motor capable of inputting and outputting power; an accumulator capable of sending and receiving power to and from each of the first and second motors; a power distribution and integration mechanism having a first element connected to a rotating shaft of the first motor; a second element connected to a rotating shaft of the second motor; a third element connected to an engine shaft of the internal combustion engine, said power distribution and integration mechanism being configured so that these three elements can be differentially rotated with respect to each other; a connection/disconnection device capable of performing a drive source element connection being any one of a connection between the first motor and the first element, a connection between the second motor and the second element, and a connection between the internal combustion engine and the third element, the connection/disconnection device capable of performing a release of the drive source element connection; a transmission mechanism capable of selectively coupling one or both of the rotating shaft of the first motor and the rotating shaft of the second motor to the drive shaft, and transmitting power from the first motor and power from the second motor to the drive shaft at a predetermined speed ratio respectively; a power demand setting module for setting a power demand which is power required for the drive shaft; and a control module for controlling the first and second motors, the connection/disconnection device, and the transmission mechanism so that power based on the set power demand is outputted to the drive shaft while performing a power transfer process of transferring power from one of the first and second motors to the other, a release of the coupling between one of the first and second motors and the drive shaft by the transmission mechanism, a rotation speed adjusting process of adjusting a rotation speed of one of the first and second motors released from the coupling to the drive shaft so as to enable the drive source element connection, the drive source element connection, and an engine start process of cranking the internal combustion engine by the first or second motor, if an engine start condition for starting the internal combustion engine is established when said transmission mechanism couples both the first and second motors to the drive shaft and at least one of the first and second motors outputs power in a state in which the drive source element connection is released and the internal combustion engine is stopped.

According to this power output apparatus, in a state in which the drive source element connection is released, the internal combustion engine is stopped, and the transmission mechanism is used to couple both the first and second motors to the drive shaft. By doing so, the internal combustion engine, can be prevented from corotating, and power from at least one of the first and second motors can be transmitted to the drive shaft at a predetermined fixed speed ratio. In this state, a larger power can be output to the drive shaft in comparison with the state in which only one of the first and second motors is caused to output power. If the engine start condition is established while power from at least one of the first and second motors is being transmitted to the drive shaft at a predetermined fixed speed ratio, a power transfer process of transferring power from one of the first and second motors to the other is executed so as to output power based on the set power demand to the drive shaft in a state in which the drive source element connection is released. Then, the coupling between one of the first and second motors by the transmission mechanism and the drive shaft is released. Further, a rotation speed adjusting process of adjusting a rotation speed of one of the first and second motors released from the coupling to the drive shaft is executed so as to enable the drive source element connection as well as output power based on the set power demand to the drive shaft. Then, the drive source element connection can be executed. When the drive source element connection is performed, the internal combustion engine can be started by cranking the internal combustion engine by one of the first and second motors as well as outputting power based on the set power demand to the drive shaft. As a result, according to this power output apparatus, the internal combustion engine can be started by more properly outputting a demanded power to the drive shaft if the engine start condition is established while in a state in which the drive source element connection is released, the internal combustion engine is stopped, and power from at least one of the first and second motors is being transmitted to the drive shaft at a predetermined fixed speed ratio by the transmission mechanism.

In this case, the power transfer process may be a process of decreasing power from one of the first and second motors and increasing power from the other one of the first and second motors so that at a time when a predetermined transfer time has elapsed since the power transfer process started, power outputted from one of the first and second motors becomes a value of 0 and power outputted from the other of the first and second motors becomes a value based on the power demand and a target speed ratio which is a speed ratio of the transmission mechanism after a coupling between one of the first and second motors and the drive shaft is released.

Moreover, the power transfer process may be a process of setting a torque command to the first motor and second motor based on power outputted from the first and second motors, a power demand set by the power demand setting module and the target speed ratio so that power based on a power demand is always outputted to the drive shaft during an execution of the power transfer process and the power transfer is completed within the transfer time. Thereby, even if the power demand is changed during the execution of the power transfer process, power based on the power demand set by the power demand setting module can be outputted more reliably to the drive shaft as well as the power can be transmitted between the first and second motors.

The power transfer process may be a process of setting a torque command to the first and second motors based on power outputted from the first and second motors when the power transfer process starts, the power demand and the target speed ratio at the start time of the power transfer process so that the power transfer is completed within the transfer time. Thereby, the power outputted to the drive shaft can be suppressed from fluctuating due to a difference in response to the torque command between the first motor and the second motor as well as the power can be transferred between the first and second motors.

Further, the rotation speed adjustment process may be a process of synchronizing a rotation speed of the first or second motor which is released from a coupling to the drive shaft with a rotation speed of the first or second element under the drive source element connection based on a rotation speed of the second or first motor which is coupled to the drive shaft.

In addition, the transmission mechanism may be a parallel shaft-type transmission including: a first transmission mechanism having at least one parallel shaft-type gear train capable of coupling one of the first and second elements of the power distribution and integration mechanism to the drive shaft; and a second transmission mechanism having at least one parallel shaft-type gear train capable of coupling a rotating shaft of the first or second motor which corresponds to the other one of the first and second elements to the drive shaft. According to such a transmission mechanism which is a parallel shaft-type transmission, one of or both of the rotating shaft of the first motor and the rotating shaft of the second motor can be selectively coupled to the drive shaft.

Further, the transmission mechanism may be a planetary gear transmission including a first transmission planetary gear mechanism having an input element connected to one of the first and second elements of the power distribution and integration mechanism, an output element connected to the drive shaft, and a fixable element, the first transmission planetary gear mechanism being configured so that these three elements can be differentially rotated with respect to each other; a first fixing mechanism capable of non-rotatably fixing said fixable element of the first transmission planetary gear mechanism; a second transmission planetary gear mechanism having an input element connected to a rotating shaft of the first or second motor which corresponds to the other of said first and second elements, and an output element connected to the drive shaft, and a fixable element, the second transmission planetary gear mechanism being configured so that these three elements can be differentially rotated with respect to each other; and a second fixing mechanism capable of non-rotatably fixing the fixable element of the second transmission planetary gear mechanism. According to such a transmission mechanism which is a planetary gear transmission, when one of the first and second fixing mechanisms is placed in a fixed state, one of the rotating shaft of the first motor and the rotating shaft of the second motor can be coupled to the drive shaft. In addition, when both the first fixing mechanism and the second fixing mechanism are placed in a fixed state, both the rotating shaft of the first motor and the rotating shaft of the second motor can be coupled to the drive shaft.

In this case; the transmission mechanism may further include a transmission connection/disconnection device capable of performing a connection and a disconnection between the output element of one of the first transmission planetary gear mechanism and the second transmission planetary gear mechanism and the fixable element. According to such a transmission mechanism, an output element of the first or second transmission planetary gear mechanism which corresponds to the transmission connection/disconnection device is connected to the fixable element by the transmission connection/disconnection device, as well as a fixable element of the second or first transmission planetary gear mechanism which does not correspond to the transmission connection/disconnection device is non-rotatably fixed. By doing so, both the rotating shaft of the first motor and the rotating shaft of the second motor can be coupled to the drive shaft. In addition, according to this transmission mechanism, an output element of the first or second transmission planetary gear mechanism which corresponds to the transmission connection/disconnection device is connected to a fixable element, as well as a fixable element of the second or first transmission planetary gear mechanism which does not correspond to the transmission connection/disconnection device is non-rotatably fixed. In this state, if the fixable element of the second or first transmission planetary gear mechanism is made to be rotatable, the individual elements of the first or second transmission planetary gear mechanism corresponding to the transmission connection/disconnection device are substantially locked by the transmission connection/disconnection device to rotate integrally. Therefore, power from one of the rotating shaft of the first motor and the rotating shaft of the second motor can be directly transmitted to the drive shaft.

The present invention is directed to a hybrid vehicle including a, drive wheel driven by power from a drive shaft. The hybrid vehicle includes: an internal combustion engine; a first motor capable of inputting and outputting power; a second motor capable of inputting and outputting power; an accumulator capable of sending and receiving power to and from each of the first and second motors; a power distribution and integration mechanism having a first element connected to a rotating shaft of the first motor; a second element connected to a rotating shaft of the second motor; a third element connected to an engine shaft of the internal combustion engine, the power distribution and integration mechanism being configured so that these three elements can be differentially rotated with respect to each other; a connection/disconnection device capable of performing a drive source element connection being any one of a connection between the first motor and the first element, a connection between the second motor and the second element, and a connection between the internal combustion engine and the third element, the connection/disconnection device capable of performing a release of the drive source element connection; a transmission mechanism capable of selectively coupling one or both of the rotating shaft of the first motor and the rotating shaft of the second motor to the drive shaft, and transmitting power from the first motor and power from the second motor to the drive shaft at a predetermined speed ratio respectively; a power demand setting module for setting a power demand which is power required for the drive shaft; and a control module for controlling the first and second motors, the connection/disconnection device, and the transmission mechanism so that power based on the set power demand is outputted to the drive shaft while performing a power transfer process of transferring power from one of the first and second motors to the other, a release of the coupling between one of the first and second motors and the drive shaft by the transmission mechanism, a rotation speed adjusting process of adjusting a rotation speed of one of the first and second motors released from the coupling to the drive shaft so as to enable the drive source element connection, the drive source element connection, and an engine start process of cranking the internal combustion engine by the first or second motor, if an engine start condition for starting the internal combustion engine is established, when the transmission mechanism couples both the first and second motors to the drive shaft and at least one of the first and second motors outputs power in a state in which the drive source element connection is released and the internal combustion engine is stopped.

According to this hybrid vehicle, the internal combustion engine can be started by more properly outputting a demanded power to the drive shaft if the engine start condition is established when, in a state in which the drive source element connection is released, the internal combustion engine is stopped, and power from at least one of the first and second motors is transmitted to the drive shaft at a predetermined fixed speed ratio by the transmission mechanism. Therefore, this hybrid vehicle can well improve the fuel consumption and the drive performance by appropriately switching a state of running in which power from at least one of the first and second motors is transmitted to the drive shaft at a predetermined fixed speed ratio and a state of running in which power is output to the drive shaft with an operation of the internal combustion engine.

The present invention is directed to a method of controlling a power output apparatus including: a drive shaft; an internal combustion engine; a first motor and a second motor capable of inputting and outputting power respectively; an accumulator capable of sending and receiving power to and from each of the first and second motors; a power distribution and integration mechanism having a first element connected to a rotating shaft of the first motor; a second element connected to a rotating shaft of the second motor; a third element connected to an engine shaft of the internal combustion engine, the power distribution and integration mechanism being configured so that these three elements can be differentially rotated with respect to each other; a connection/disconnection device capable of performing a drive source element connection being any one of a connection between said first motor and the first element, a connection between the second motor and the second element, and a connection between the internal combustion engine and the third element, the connection/disconnection device capable of performing a release of the drive source element connection; a transmission mechanism capable of selectively coupling one or both of the rotating shaft of the first motor and the rotating shaft of the second motor to the drive shaft, and transmitting power from the first motor and power from the second motor to the drive shaft at a predetermined speed ratio respectively. The control method includes steps of: (a) transferring power from one of the first and second motors to the other, if an engine start condition for starting the internal combustion engine is established when the transmission mechanism couples both the first and second motors to the drive shaft and at least one of the first and second motors outputs power in a state in which the drive source element connection is released and the internal combustion engine is stopped; (b) releasing the coupling between one of the first and second motors and the drive shaft by the transmission mechanism; (c) adjusting a rotation speed of one of the first and second motors released from the coupling to the drive shaft so as to enable the drive source element connection; (d) executing the drive source element connection; and (e) starting the internal combustion engine with cranking by the first or second motor.

According to this method, the internal combustion engine can be started by more properly outputting a demanded power to the drive shaft if the engine start condition is established while in a state in which the drive source element connection is released, the internal combustion engine is stopped, and power from at least one of the first and second motors is being transmitted to the drive shaft at a predetermined fixed speed ratio by the transmission mechanism.

Moreover, in the method of controlling the power output apparatus in accordance with the present invention, the torque command to the first and second motors may be set so that power based on the power demand required for the drive shaft is outputted during the execution of the steps (a) to (e).

Further, the step (a) may be a process of decreasing power from one of the first and second motors and increases power from the other one of the first and second motors so that at a time when a predetermined transfer time has elapsed since its start, power outputted from one of the first and second motors becomes a value of 0 and power outputted from the other of the first and second motors becomes a value based on the power demand and a target speed ratio which is a speed ratio of the transmission mechanism after a coupling between one of the first and second motors and the drive shaft is released. In this case, the step (a) may be a process of setting a torque command to the first and second motors based on power outputted from the first and second motors, the power demand and the target speed ratio so that power based on a power demand is always outputted to the drive shaft during an execution of the power transfer process and the power transfer is completed within the transfer time. In addition, the step (a) may be a process of setting a torque command to the first and second motors based on power outputted from the first and second motors at the start time of the step (a), the power demand at, the start time and the target speed ratio so that the power transfer is completed within the transfer time.

In addition, the step (c) may synchronize a rotation speed of the first or second motor which is released from a coupling to the drive shaft with a rotation speed of the first or second element under the drive source element connection based on a rotation speed of the second or first motor which is coupled to the drive shaft.

BRIEF DESCRIPTION OF THE DRAWINGS

FIG. 6 is an explanatory drawing similar to FIG. 2;
FIG. 7 is an explanatory drawing similar to FIG. 2.

BEST MODE FOR CARRYING OUT THE INVENTION

Hereinafter, the best mode for carrying out the invention will be described with reference to embodiments.

Figure 1:
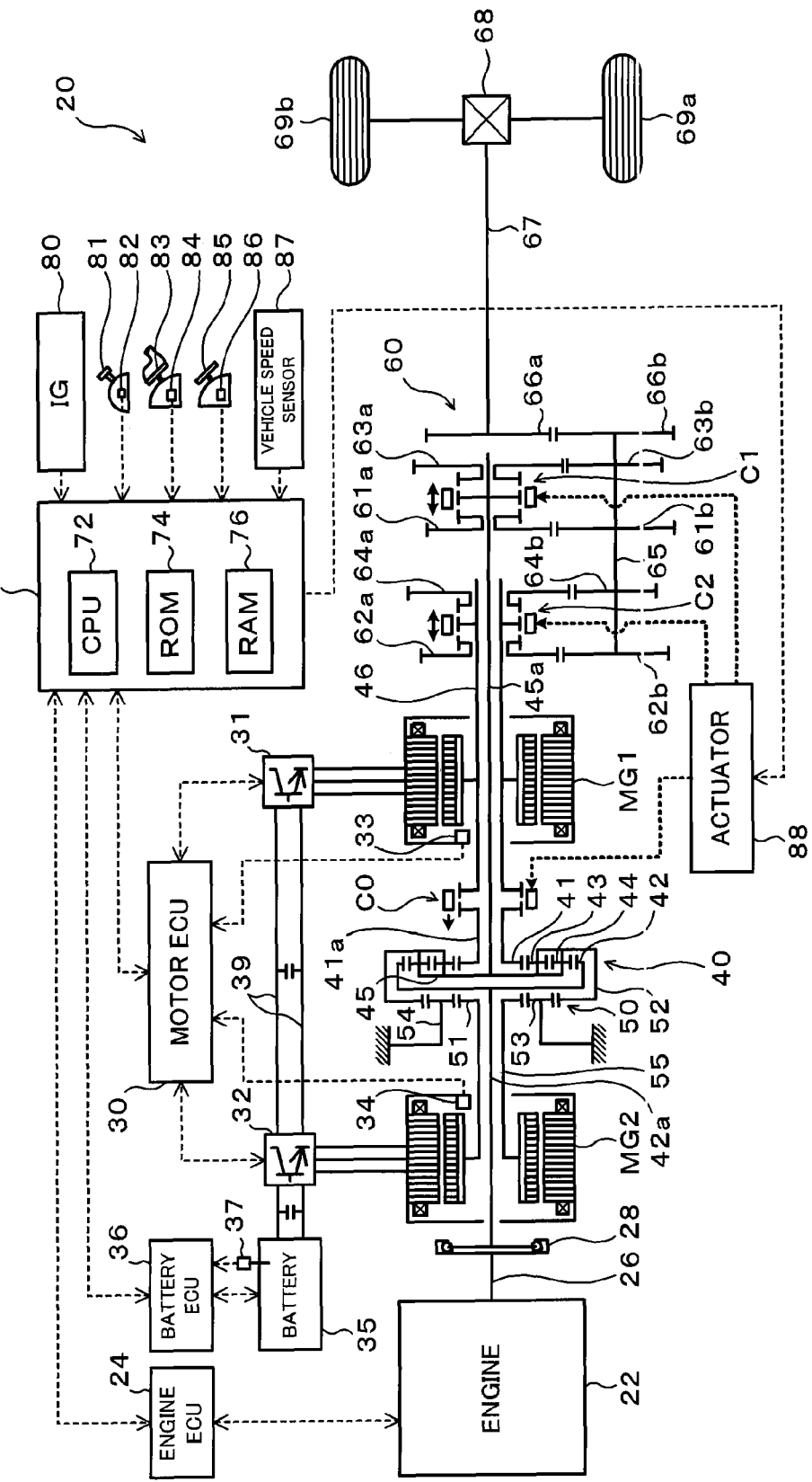
FIG. 1 is a schematic configuration view of a hybrid vehicle 20 in accordance with an embodiment of the present invention.

FIG. 1 is a schematic configuration view of a hybrid vehicle 20 in accordance with a present embodiment of the present invention. The hybrid vehicle 20 shown in the same figure is configured as a rear-wheel-drive vehicle, and includes an engine 22 arranged in a vehicle front portion; a power distribution and integration mechanism (differential rotation mechanism) 40 connected to a crankshaft 26 which is an output shaft of the engine 22; a generatable, motor MG1 connected to the power distribution and integration mechanism 40; a generatable motor MG2 arranged coaxially with the motor MG1 and connected to the power distribution and integration mechanism 40 through a reduction gear mechanism 50; a transmission 60 capable of transmitting power from the power distribution and integration mechanism 40 to a drive shaft 67 with a change in speed ratio; and a hybrid electronic control unit (hereinafter referred to as "hybrid ECU") 70 for controlling the entire hybrid vehicle 20 and the like.

The engine 22 is an internal combustion engine which outputs power by receiving a supply of a hydrocarbonaceous fuel such as gasoline and a diesel oil, and receives control of a fuel injection amount, an ignition timing, an intake air amount, and the like from an engine electronic control unit (hereinafter referred to as "engine ECU") 24. The engine ECU 24 receives signals from various kinds of sensors which are provided with respect to the engine 22 and detect an operating state of the engine 22. Moreover, the engine ECU 24 communicates with the hybrid ECU 70, controls the operation of the engine 22 based on control signals from the hybrid ECU 70 and signals from the above sensors, and outputs data about the operating state of the engine 22 to the hybrid ECU 70 as needed.

Each of the motor MG1 and the motor MG2 is configured as a known synchronous generator/motor which can operate not only as a generator, but also as a motor; and supplies and receives electric power to and from a battery 35 which is a secondary battery through inverters 31 and 32. Power lines 39 connecting the inverters 31 and 32 and the battery 35 are configured as a positive electrode bus line and a negative electrode bus line shared by the individual inverters 31 and 32; and are configured such that the power generated by one of the motors MG1 and MG2 can be consumed by the other motor. Therefore, the battery 35 is charged with electric power generated by one of the motors MG1 and MG2 and is discharged due to electric power shortage. If the electric power consumption and generation is balanced between the motors MG1 and MG2, the battery 35 is assumed to be neither charged nor discharged. Both the motors MG1 and MG2 are drive-controlled by a motor electronic control unit (hereinafter referred to as "motor ECU") 30. The motor ECU 30 receives a signal necessary for drive-controlling the motors MG1 and MG2; for example, a signal from rotational position detection sensors 33 and 34 for detecting a rotational position of a rotor of motors MG1 and MG2; and a phase current which is detected by a current sensor (not shown) and is applied to the motors MG1 and MG2. The motor ECU 30 outputs a switching control signal to inverters 31 and 32 and the like. The motor ECU 30 executes a rotation speed calculation routine (not shown) based on a signal inputted from the rotational position detection sensors 33 and 34, and calculates the rotation speeds Nm1 and Nm2 of rotors of the motors MG1 and MG2. Moreover, the motor ECU 30 communicates with the hybrid ECU 70, drive-controls the motors MG1 and MG2, based on control signals from the hybrid ECU 70 and the like, and outputs data about the operating states of, the motors MG1 and MG2 to the hybrid ECU 70 as needed.

The battery 35 is managed by a battery electronic control unit (hereinafter referred to as (battery ECU) 36. The battery ECU 36 receives a signal necessary for managing the battery 35, for example, an inter-terminal voltage from a voltage sensor (not shown) provided between the terminals of the battery 35; a charge-discharge current from a current sensor (not shown) provided on the power line 39 connected to an output terminal of the battery 35; a battery temperature Tb from a temperature sensor 37 attached to the battery 35, and the like. The battery ECU 36 outputs data about a state of the battery 35 to the hybrid ECU 70 and the engine ECU 24 through communication as needed. Further, the battery ECU 36 calculates a state of charge (SOC) based on an integrated value of charge and discharge currents detected by the current sensor in order to manage the battery 35.

The power distribution and integration mechanism 40 is housed in a transmission case (not shown) together with the motors MG1 and MG2, the reduction gear mechanism 50, the transmission 60, and arranged coaxially with a crankshaft 26 spaced at a predetermined distance from the engine 22. The power distribution and integration mechanism 40 of the present embodiment is a double pinion planetary gear mechanism having a sun gear 41 which is an external gear; a ring gear 42 which is an internal gear arranged concentrically with the sun gear 41; a carrier 45 which rotatably and spinably holds at least one pair of two pinion gears 43 and 44 meshed with each other, one of which is meshed with the sun gear 41 and the other of which is meshed with the ring gear 42; and is configured such that the sun gear 41 (second element), the ring gear (third element), and the carrier 45 (first element) can differentially rotate with each other. According to the present embodiment, the motor MG1 (hollow rotor) serving as the second motor is connected to the sun gear 41 which is a second element of the power distribution and integration mechanism 40 through a hollow sun gear shaft 41a extending from the sun gear 41 to an opposite side (rear part of the vehicle) of the engine 22 and a hollow first motor shaft 46. Moreover, the motor MG2 (hollow rotor) serving as the first motor is connected to the carrier 45 which is a first element through the reduction gear mechanism 50 provided between the power distribution and integration mechanism 40 and the engine 22 and a hollow second motor shaft 55 extending toward the engine 22 from the reduction gear mechanism 50 (sun gear 51). Further, a crankshaft 26 of the engine 22 is connected to the ring gear 42 which is a third element through the ring gear shaft 42a extending through the second motor shaft 55 and the motor MG2, and a damper 28.

Moreover, as, shown in FIG. 1, a clutch C0 (connection/disconnection device) is provided between the sun gear shaft 41a and the first motor shaft 46 so as to perform a connection and a disconnection therebetween (drive source element connection). According to the present embodiment, the clutch C0 is configured, for example, as a dog clutch which can provide a mesh between a dog fixed to a leading edge of the sun gear shaft 41a and a dog fixed to a leading edge of the first motor shaft 46 with less loss and can release the mesh therebetween; and is driven by an electric, electromagnetic, or, hydraulic actuator 88. When the clutch C0 releases the connection between the sun gear shaft 41a and the first motor shaft 46, the connection between the motor MG1 serving as the second motor and the sun gear 41 which is a second element of the power distribution and integration mechanism 40 is released. In short, a function of the power distribution and integration mechanism 40 can substantially disconnect the engine 22 from the motors MG1 and MG2 and the transmission 60.

As described above, the first motor shaft 46 which can be coupled to the sun gear 41 of the power distribution and integration mechanism 40 through the clutch C0 further extends from the motor MG1 to an opposite side (rear part of the vehicle) of the engine 22, and is connected to the transmission 60. Moreover, a carrier shaft (coupling shaft) 45a extends from the carrier 45 of the power distribution and integration mechanism 40 to an opposite side (rear part of the vehicle) of the engine 22 through the hollow sun gear shaft 41a and the first motor shaft 46, and the carrier shaft 45a is also connected to the transmission 60. Thereby, according to the present embodiment, the power distribution and integration mechanism 40 is provided between the motors MG1 and MG2 which are arranged coaxially with each other, and is arranged coaxially with both the motors MG1 and MG2; and the engine 22 is arranged coaxially with the motor MG2 and faces the transmission 60 with the power distribution and integration mechanism 40 therebetween. That is, according to the present embodiment, the components of the power output apparatus such as the engine 22, the motors MG1 and MG2, the power distribution and integration mechanism 40, and the transmission 60 are arranged starting with the engine 22, the motor MG2 (reduction gear mechanism 50), the power distribution and integration mechanism 40, the motor MG1, and the transmission 60 in that order starting at the front part of the vehicle. This allows the power output apparatus to be compact in size, excellent in mountability, preferable for the hybrid vehicle 20 which runs mainly by driving rear wheels.

Moreover, according to the present embodiment, as described above, the sun gear 41 which is a second element of the power distribution and integration mechanism 40 is connected to the transmission 60 through the sun gear shaft 41a, and clutch C0, and the first motor shaft 46; and the carrier 45 which is a first element of the power distribution and integration mechanism 40 is connected to the transmission 60 through the carrier shaft 45a. Thereby, according to the hybrid vehicle 20, one of the sun gear 41 and the carrier 45 of power distribution and integration mechanism 40 is set to a reaction element receiving a reaction of a torque outputted from the engine 22, and the other is set to an output element; and thereby power can be outputted to the transmission 60. If the sun gear 41 is set to the reaction element, the motor MG1 functions as a generator. In this case, the power distribution and integration mechanism 40 receives power from the engine 22 through the ring gear 42 and distributes the power to the sun gear 41 side and the carrier 45 side according to the gear ratio; integrates the power from the engine 22 and power from the motor MG2 functioning as a motor and outputs the integrated power to the carrier 45 side. If the carrier 45 is set to the reaction element, the motor MG2 functions as a generator. In this case, the power distribution and integration mechanism 40 receives power from the engine 22 through the ring gear 42 and distributes the power to the sun gear 41 side and the carrier 45 side according to the gear ratio; integrates the power from the engine 22 and the power from the motor MG1 functioning as a motor and outputs the integrated power to the sun gear 41 side.

The reduction gear mechanism 50 is a single pinion planetary gear mechanism having a sun gear 51 which is an external gear; a ring gear 52 which is an internal gear arranged concentrically with the sun gear 51; a plurality of pinion gears 53 which are meshed with both the sun gear 51 and the ring gear 52; and a carrier 54 which rotatably and spinably holds the plurality of pinion gears 53. The sun gear 51 of the reduction gear mechanism 50 is connected to a rotor of the motor MG2 through the above described second motor shaft 55. Moreover, the ring gear 52 of the reduction gear mechanism 50 is fixed to the carrier 45 of the power distribution and integration mechanism 40. Thereby, the reduction gear mechanism 50 is substantially integral with the power distribution and integration mechanism 40. The carrier 54 of the reduction gear mechanism 50 is fixed with respect to the transmission case. Therefore, by the operation of the reduction gear mechanism 50, the power from the motor MG2 is reduced in speed and is inputted to the carrier 45 of the power distribution and integration mechanism 40; and at the same time, the power from the carrier 45 is increased in speed and is inputted to the motor MG2. It should be noted that as shown in the present embodiment, the power output apparatus can be more compact by placing the reduction gear mechanism 50 between the motor MG2 and the power distribution and integration mechanism 40 so as to be formed integrally with the power distribution and integration mechanism 40.

The transmission 60 is configured as an automatic parallel shaft-type transmission capable of setting a speed ratio at a plurality of stages, and includes a first counter drive gear 61a and a first counter driven gear 61b constituting the first speed gear train; a second counter drive gear 62a and a second counter driven gear 62b constituting the second speed gear train; a third counter drive gear 63a and a third counter driven gear 63b constituting the third speed gear train; a fourth counter drive gear 64a and a fourth counter driven gear 64b constituting the fourth speed gear train; a countershaft 65 to which individual counter driven gears 61b to 64b and gear 66b are fixed; clutches C1 and C2; a gear 66a attached to the drive shaft 67; further a reverse gear train (not shown) and the like (hereinafter, as needed, the "counter drive gear" and the "counter driven gear" are simply referred to as "gear"). It should be noted that in the transmission 60, the first speed gear train has a maximum gear ratio; and changing to the second speed gear train, to the third speed gear train, and to the fourth speed gear train reduces the gear ratio accordingly.

As shown in FIG. 1, the first gear 61a of the first speed gear train is held rotatably and non-movably in the axial direction on the carrier shaft 45a extended from the carrier 45 which is a first element of the power distribution and integration mechanism 40 and is always meshed with the first gear 61b fixed to the countershaft 65. Likewise, the third gear 63a of the third speed gear train is also held rotatably and non-movably in the axial direction on the carrier shaft 45a, and is always meshed with the third gear 63b fixed to the countershaft 65. According to the present embodiment, the clutch C1 is provided on the carrier shaft 45a side (counter drive gear side) so as to selectively fix one of the first gear 61a (first speed gear train) and the third gear 63a (third speed gear train) to the carrier shaft 45a and to be able to rotatably release both the first gear 61a and the third gear 63a with respect to the carrier shaft 45a. According to the present embodiment, the clutch C1 is configured as, for example, a dog clutch which can mesh a dog which is held non-rotatably and movably in the axial direction on the carrier shaft 45a with one of the dog fixed to the first gear 61a and the dog fixed to the third gear 63a with less loss, and can release the mesh therebetween; and is driven by the above described actuator 88. These gears 61a and 61b of the first speed gear train, the gears 63a and 63b of the third speed gear train, and the clutch C1 constitute a first transmission mechanism of the transmission 60. Moreover, the second gear 62a of the second speed gear train is held rotatably and non-movably in the axial direction on the first motor shaft 46 which can be coupled with the sun gear 41 which is a second element of the power distribution and integration mechanism 40 through the clutch C0; and is always meshed with, the second gear 62b fixed to the countershaft 65. Likewise, the fourth gear 64a of the fourth speed gear train is held rotatably and non-movably in the axial direction on the first motor shaft 46 and is always meshed with the fourth gear 64b fixed to the countershaft 65. According to the present embodiment, the clutch C2 is provided on the first motor shaft 46 side (counter drive gear side) so as to selectively fix one of the second gear 62a (second speed gear train) and the fourth gear 64a (fourth speed gear train) to the first motor shaft 46 and to be able to rotatably release both the second gear 62a and the fourth gear 64a with respect to the first motor shaft 46. According to the present embodiment, the clutch C2 is also configured as, for example, a dog clutch which can mesh a dog which is held non-rotatably and movably in the axial direction on the first motor shaft 46 with one of the dog fixed to the second gear 62a and the dog fixed to the fourth gear 64a with less loss, and can release the mesh therebetween; and is driven by the above described actuator 88. These gears 62a and 62b of the second speed gear train, the gears 64a and 64b of the fourth speed gear train, and the clutch C2 constitute a second transmission mechanism of the transmission 60. It should be noted that according to the present embodiment, the actuator 88 is illustrated as a single unit, but it is obvious that the clutches C0, C1, and C2 may be driven individually.

Moreover, a power transmitted from the carrier shaft 45a or the first motor shaft 46 to the countershaft 65 is transmitted to the drive shaft 67 through the gears 66a and 66b and is finally outputted to the rear wheels 69a and 69b as the drive wheels through the differential gear 68. It should be noted that according to the transmission 60 of the present embodiment, it is possible to reduce the loss when the clutches C1 and C2 are used to fix the gears 61a to 64a to the carrier shaft 45a or the first motor shaft 46 by providing the clutches C1 and C2 on the carrier shaft 45a and the first motor shaft 46 side. That is, depending on the gear ratio of an individual gear train, particularly about the second transmission mechanism including the fourth speed gear train having a small reduction gear ratio, the rotation speed of the gear 64a which is idle before being fixed to the first motor shaft 46 by the clutch C2 is lower than the rotation speed of the corresponding gear 64b on the countershaft 65 side. Therefore, a dog of the gear 64a can be engaged with a dog of the first motor shaft 46 with less loss by at least providing the clutch C2 on the first motor shaft 46 side. It should be noted that about the first transmission mechanism including the first speed gear train having a large reduction gear ratio, the clutch C1 may be provided on the countershaft 65 side.

According to the transmission 60 configured as described above, when the clutch C2 is released, and the clutch C1 is used to fix one of the first gear 61a (first speed gear train) and the third gear 63a (third speed gear train) to the carrier shaft 45a, power from the carrier shaft 45a can be transmitted to the drive shaft 67 through the first gear 61a (first speed gear train) or the third gear 63a (third speed gear train) and the countershaft 65. Moreover, when the clutch C0 is connected, the clutch C1 is released, and the clutch C2 is used to fix one of the second gear 62a (second speed gear train) and fourth gear 64a (fourth speed gear train) to the first motor shaft 46, power from the first motor shaft 46 can be transmitted to the drive shaft 67 through the second gear 62a (second speed gear train) or the fourth gear 64a (fourth speed gear train) and the countershaft 65. Hereinafter, as needed, a state of transmitting power using the first speed gear train is referred to as "first speed state (1st speed)", a state of transmitting power using the second speed gear train is referred to as "second speed state (2nd speed)", a state of transmitting power using the third speed gear train is referred to as "third speed state (3rd speed)", and a state of transmitting power using the fourth speed gear train is referred to as "fourth speed state (4th speed)". Moreover, according to the transmission 60 of the present embodiment, the clutches C1 and C2 are provided on the carrier shaft 45a and the first motor shaft 46 side, and thus, it is possible to reduce the loss when the clutches C1 and C2 are used to fix the gears 61a to 64a to the carrier shaft 45a or the first motor shaft 46. That is, depending on the gear ratio of an individual gear train, particularly about the second transmission mechanism including the fourth speed gear train having a small reduction gear ratio, the rotation speed of the gear 64a which is idle before being fixed to the first motor shaft 46 by the clutch C2 is lower than the rotation speed of the corresponding gear 64b on the countershaft 65 side. Therefore, a dog of the gear 64a can be engaged with a dog of the first motor shaft 46 with less loss by at least providing the clutch C2 on the first motor shaft 46 side. It should be noted that about the first transmission mechanism including the first speed gear train having a large reduction gear ratio, the clutch C1 may be provided on the countershaft 65 side.

The hybrid ECU 70 is configured as a microprocessor around a CPU 72, and in addition to the CPU 72, includes a ROM 74 for storing a processing program; a RAM 76 for temporarily storing data; an input/output port (not shown); and a communication port (not shown). The hybrid ECU 70 receives an ignition signal from an ignition switch (start switch) 80; a shift position SP from a shift position sensor 82 for detecting the shift position SP which is an operation position of a shift lever 81; an accelerator opening Acc from an accelerator pedal position sensor 84 for detecting the amount of depression of an accelerator pedal 83; a brake pedal position BP from a brake pedal position sensor 86 for detecting the amount of depression of a brake pedal 85; and a vehicle speed V from a vehicle speed sensor 87 through the input port. As described above, the hybrid ECU 70 is connected to the engine ECU 24, the motor ECU 30, and the battery ECU 36 through a communication port, and sends and receives Various kinds of control signals and data to and from the engine ECU 24, the motor ECU 30, and the battery ECU 36. Moreover, the hybrid ECU 70 also controls the actuator 88 which drives the clutch C0, and the clutches C1 and C2 of the transmission 60.

Figure 2:
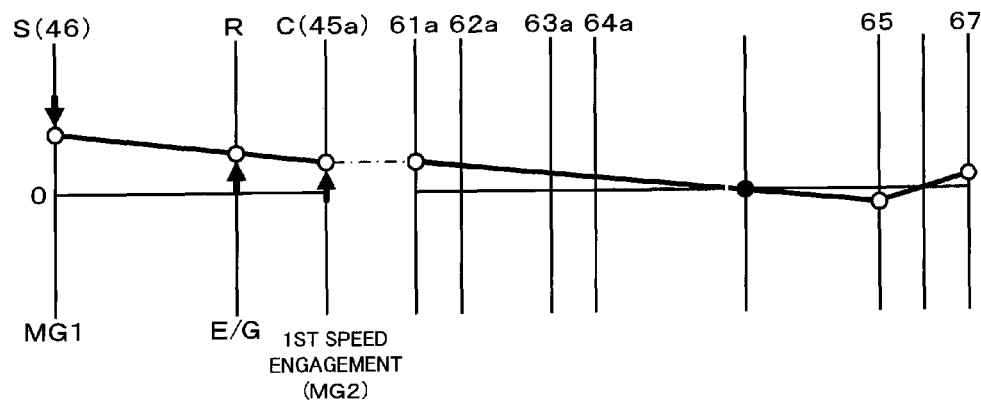
FIG. 2 is an explanatory drawing illustrating a relationship of a rotation speed and a torque of major elements of a power distribution and integration mechanism 40 and a transmission 60 when the speed ratio of the transmission 60 is changed according to the speed change of the vehicle when the hybrid vehicle 20 of the present embodiment runs with an operation of an engine 22.
Figure 3:
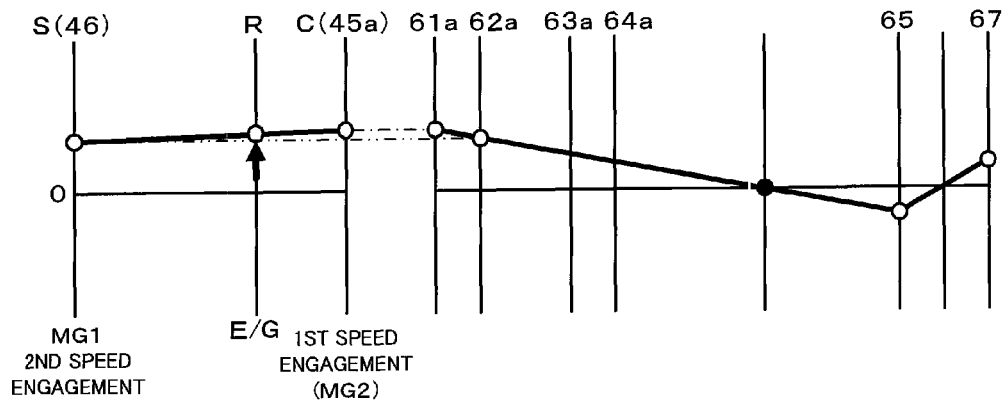
FIG. 3 is an explanatory drawing similar to FIG. 2.

Next, with reference to FIGS. 2 to 8, the outline of an operation of the above hybrid vehicle 20 will be described. When the above described hybrid vehicle 20 runs with an engagement of the clutch C0 and an operation of the engine 22, if the clutch C2 is released and the first gear 61a (first speed gear train) is fixed to the carrier shaft 45a by the clutch C1, as shown in FIG. 2, power from the carrier shaft 45a can be changed in speed (reduced) based on the speed ratio of the first speed gear train (first gears 61a and 61b) and can be outputted to the drive shaft 67. Moreover, according to the change in vehicle speed V, as shown in FIG. 3, in the first speed state in which the first gear 61a (first speed gear train) is fixed to the carrier shaft 45a by the clutch C1, if the second gear 62a (second speed gear train) is fixed to the first motor shaft 46 by the clutch C2 and each of the torque commands to the motors MG1 and MG2 is set to a value of 0, power (torque) from the engine 22 can be transmitted mechanically (directly) to the drive shaft 67 without conversion to electrical energy at a fixed (constant) speed ratio (a value between the speed ratio of the first speed gear train and the speed ratio of the second speed gear train). Hereinafter, the state (FIG. 3) in which the first speed gear train of the transmission 60 is used to couple the carrier 45 which is a first element of the power distribution and integration mechanism 40, and the second speed gear train of the transmission 60 is used to couple the sun gear 41 which is a second element thereof to the drive shaft 67 is referred to as "1st to 2nd simultaneous engagement state".

Figure 4:
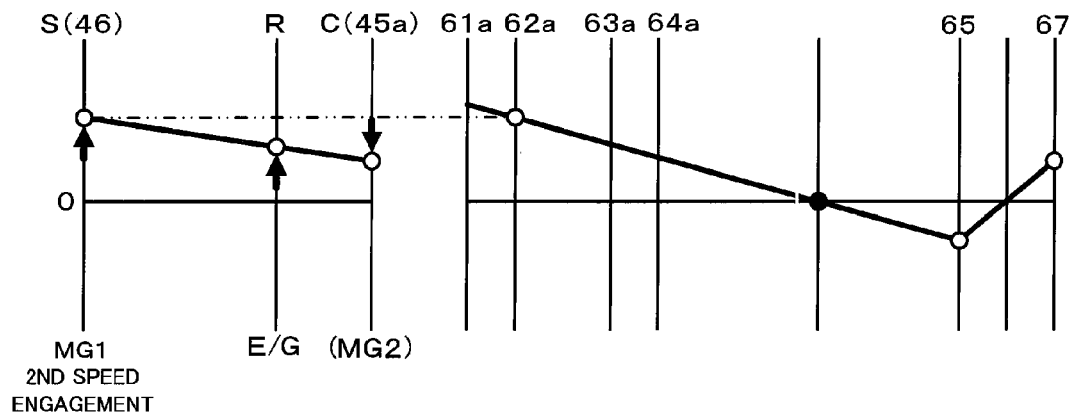
FIG. 4 is an explanatory drawing similar to FIG. 2.
Figure 5:
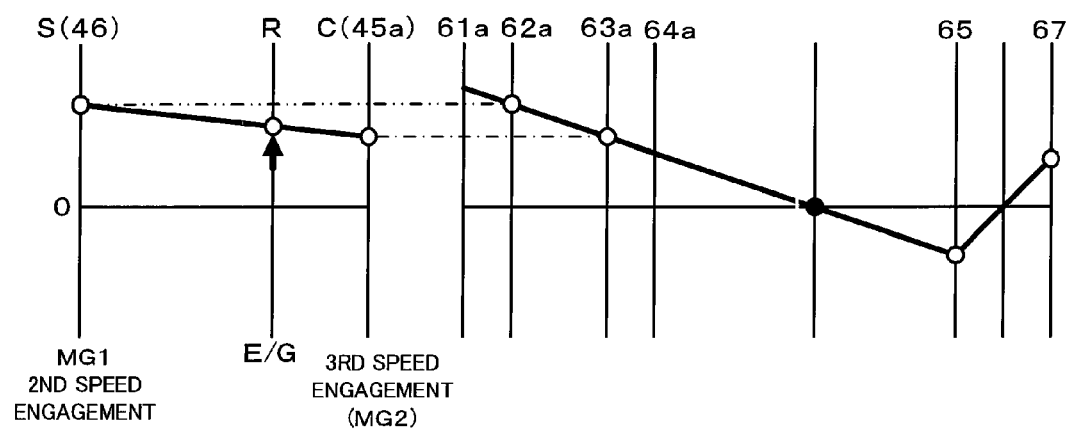
FIG. 5 is an explanatory drawing similar to FIG. 2.
Figure 8:
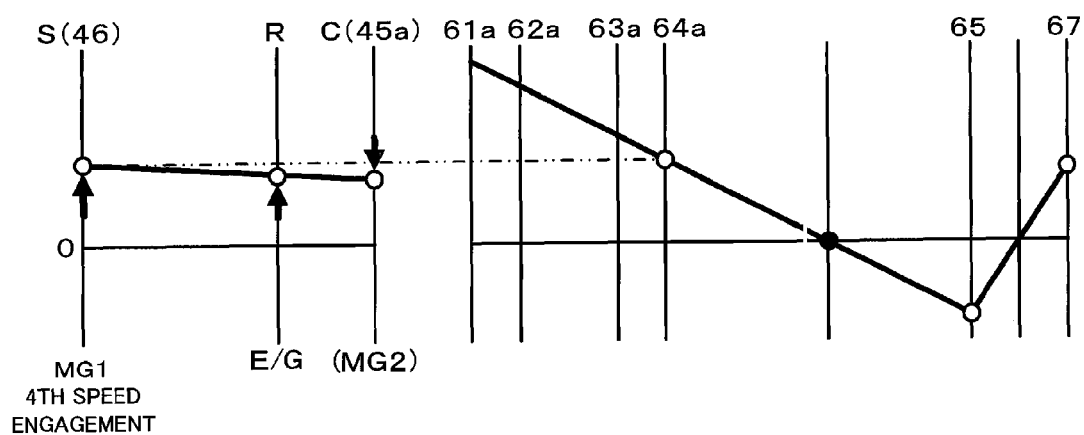
FIG. 8 is an explanatory drawing similar to FIG. 2.

Further, when the clutch C1 is released in the 1st to 2nd simultaneous engagement state shown in FIG. 3, as shown by the two-dot chain line in FIG. 4, the clutch C2 allows only the second gear 62a (second speed gear train) to be fixed to the first motor shaft 46 (sun gear 41) and thereby, power from the first motor shaft 46 can be changed in speed based on the speed ratio of the second speed gear train (second gears 62a and 62b) and can be output to the drive shaft 67. Moreover, according to the change in vehicle speed V, in the second speed state in which the clutch C2 is used to fix the second gear 62a (second speed gear train) to the first motor shaft 46 as shown in FIG. 5, if the clutch C1 is used to fix the third gear 63a (third speed gear train) to the carrier shaft 45a and set each of the torque commands to the motors MG1 and MG2 to a value of 0, power (torque) from the engine 22 can be transmitted mechanically (directly) to the drive shaft 67 without conversion to electrical energy at a fixed (constant) speed ratio (a value between the speed ratio of the second speed gear train and the speed ratio of the third speed gear train) different from that in the 1st to 2nd simultaneous engagement state. Hereinafter, the state (FIG. 5) in which the second speed gear train of the transmission 60 is used to couple the sun gear 41 which is a second element of the power distribution and integration mechanism 40, and the third speed gear train of the transmission 60 is used to couple the carrier 45 which is a first element thereof to the drive shaft 67 is referred to as "2nd to 3rd simultaneous engagement state".

Then, when the clutch C2 is released in the 2nd to 3rd simultaneous engagement state shown in FIG. 5, as shown by the one-dot chain line in FIG. 6, the clutch C1 allows only the third gear 63a (third speed gear train) to be fixed to the carrier shaft 45a (carrier 45). Thereby, power from the carrier shaft 45a can be changed in speed based on the speed ratio of the third speed gear train (third gears 63a and 63b) and can be outputted to the drive shaft 67. Further, according to the change in vehicle speed V as shown in FIG. 7, in the third speed state in which the clutch C1 is used to fix the third gear 63a (third speed gear train) to the carrier shaft 45a, when the clutch C2 is used to fix the fourth gear 64a (fourth speed gear train) to the first motor shaft 46 and set the individual torque command to the motors MG1 and MG2 to a value of 0, power (torque) from the engine can be transmitted mechanically (directly) to the drive shaft 67 without conversion to electrical energy at a fixed (constant) speed ratio (a value between the speed ratio of the third speed gear train and the speed ratio of the fourth speed gear train) different from that in the 1st to 2nd simultaneous engagement state and the 2nd to 3rd simultaneous engagement state. Hereinafter, the state (FIG. 7) in, which the third speed gear train of the transmission 60 is used to fix the carrier 45 which is a first element of the power distribution and integration mechanism 40, and the fourth speed gear train of the transmission 60 is used to fix the sun gear 41 which is a second element thereof to the drive shaft 67 is referred to as "3rd to 4th simultaneous engagement state". Afterward, when the clutch C1 is released in the 3rd to 4th simultaneous engagement state shown in FIG. 7, as shown by the two-dot chain line in FIG. 8, the clutch C2 allows only the fourth gear 64a (fourth speed gear train) to be fixed to the first motor shaft 46 (sun gear 41). Thereby, power from the first motor shaft 46 can be changed in speed based on the speed ratio of the fourth speed gear train (fourth gears 64*a* and 64*b*) and can be outputted to the drive shaft 67. It should be noted that with reference to FIGS. 2 to 8, the S axis indicates a rotation speed (rotation speed Nm1 of the motor MG1, namely, the first motor shaft 46) of the sun gear 41 of the power distribution and integration mechanism 40; the R axis indicates a rotation speed (rotation speed Ne of the engine 22) of the ring gear 42 of the power distribution and integration mechanism 40; and the C axis indicates a rotation speed of the carrier 45 of the power distribution and integration mechanism 40 (the carrier shaft 45*a* and the ring gear 52 of the reduction gear mechanism 50) respectively. Moreover, the 61*a* axis to 64*a* axis, the 65 axis, and the 67 axis each indicate a rotation speed of the first gear 61*a* to the fourth gear 64*a* of the transmission 60, the countershaft 65, and the drive shaft 67 respectively.

Figure 9:
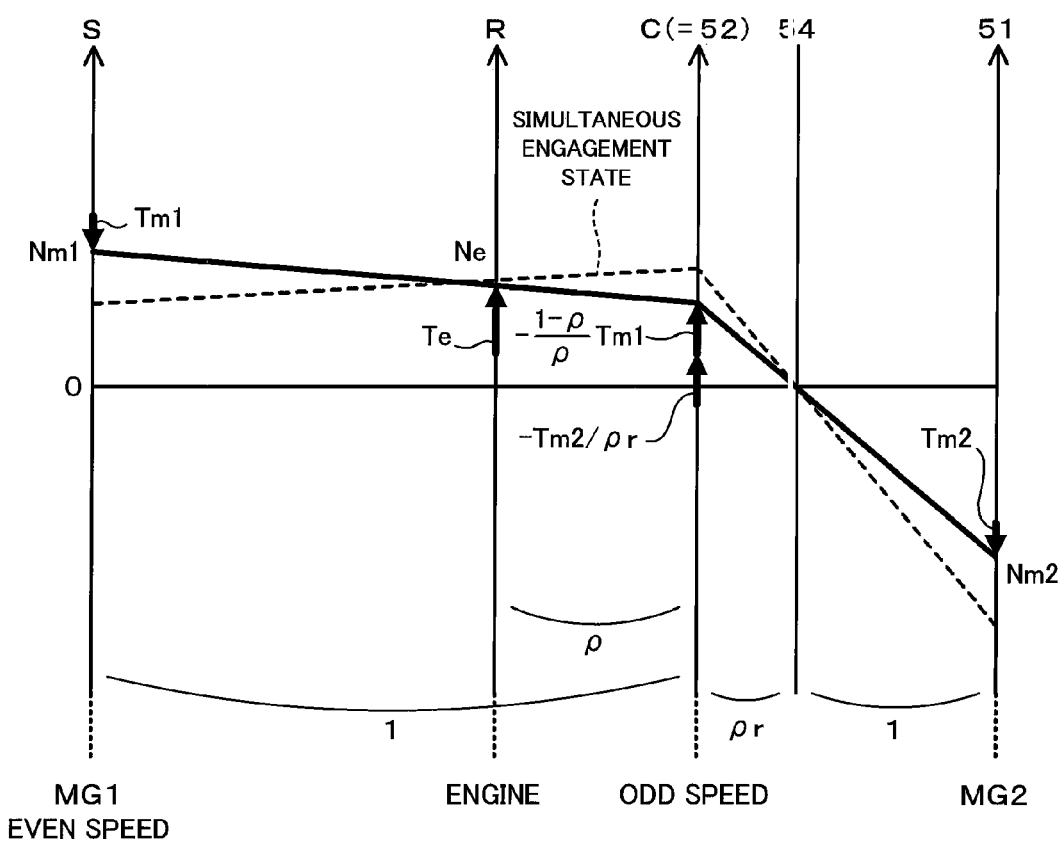
FIG. 9 is an explanatory drawing showing an example of an alignment chart representing a relationship of a rotation speed and a torque between an individual element of the power distribution and integration mechanism 40 and an individual element of a reduction gear mechanism 50 when a motor MG1 functions as a generator and a motor MG2 functions as a motor.

While the hybrid vehicle 20 is running with an operation of the engine 22 as described above, when the transmission 60 is set to the first or third speed state, the carrier 45 of the power distribution and integration mechanism 40 becomes the output element. Thereby, the motors MG1 and MG2 can be drive-and-controlled such that the motor MG2 connected to the carrier 45 functions as a motor, and the motor MG1 connected to the sun gear 41 which becomes a reaction element functions as a generator. Hereinafter, the mode in which the motor MG1 functions as a generator and the motor MG2 functions as a motor is referred to as "first torque conversion mode". FIG. 9 shows an example of an alignment chart representing a relationship of a rotation speed and a torque between an individual element of the power distribution and integration mechanism 40 and an individual element of the reduction gear mechanism 50 in the first torque conversion mode. It should be noted that in the FIG. 9, the S axis, the R axis, and the C axis denote like elements shown in FIGS. 2 to 8; the 54 axis denotes a rotation speed of the carrier 54 of the reduction gear mechanism 50; the 51 axis denotes a rotation speed (rotation speed Nm2 of the motor MG2, namely, the second motor shaft 55) of the sun gear 51 of the reduction gear mechanism 50; $\rho$ denotes a gear ratio (the number of teeth of the sun gear 41/the number of teeth of the ring gear 42) of the power distribution and integration mechanism 40; and $\rho r$ denotes a reduction gear ratio (the number of teeth of the sun gear 51/the number of teeth of the ring gear 52) of the reduction gear mechanism 50 respectively. Moreover, in FIG. 9, a thick arrow indicates a torque acting on an individual element. An upward arrow in the Figure indicates that the value of the torque is positive; and a downward arrow in the Figure indicates that the value of the torque is negative (same as in FIGS. 2 to 8, and 10 and 11). In the first torque conversion mode, the power distribution and integration mechanism 40 and the motors MG1 and MG2 perform a torque conversion on power from the engine 22 and output the power to the carrier 45; and the ratio between the rotation speed Ne of the engine 22 and the rotation speed of the carrier 45 which is an output element can be changed steplessly and Continuously by controlling the rotation speed of the motor MG1. While the hybrid vehicle 20 is running with an operation of the engine 22, when the transmission 60 is set to the second or fourth speed state, the sun gear 41 of the power distribution and integration mechanism 40 becomes the output element. Thereby, the motors MG1 and MG2 can be drive-and-controlled such that the motor MG1 connected to the sun gear 41 functions as a motor, and the motor MG2 connected to the carrier 45 which becomes a reaction element functions as a generator. Hereinafter, the mode in which the motor MG2 functions as a generator and the motor MG1 functions as a motor is referred to as a "second torque conversion mode".

Figure 10:
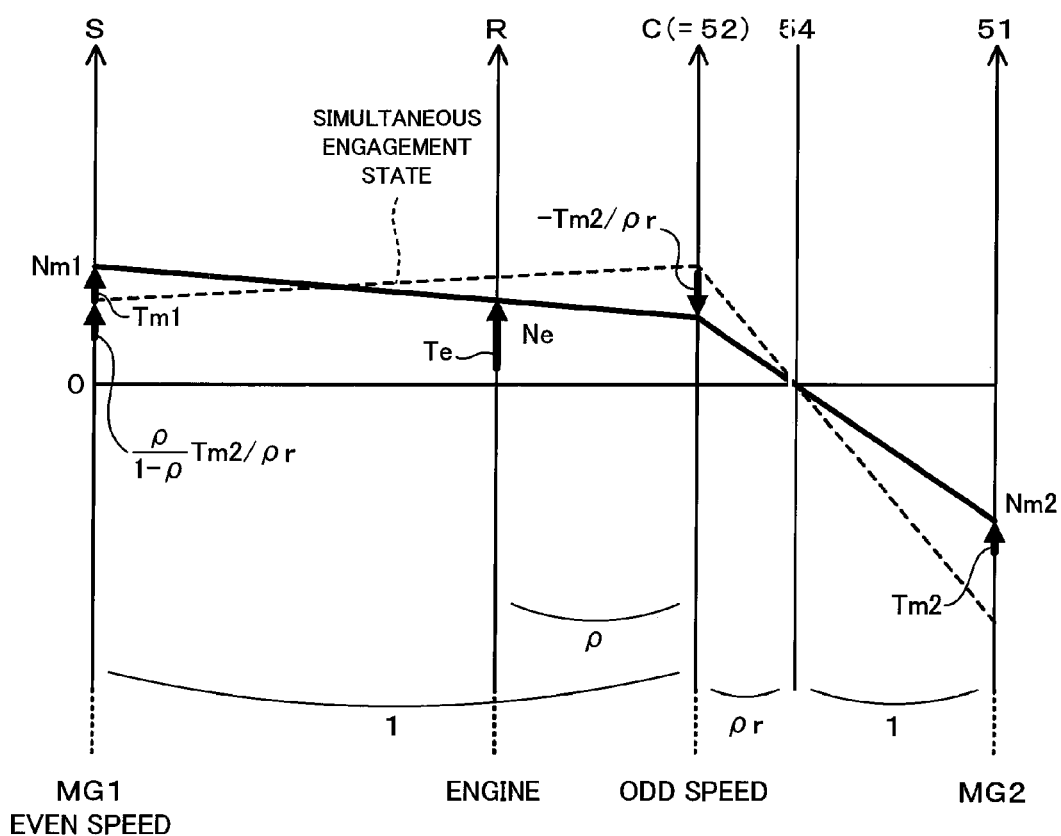
FIG. 10 is an explanatory drawing showing an example of an alignment chart representing a relationship of a rotation speed and a torque between an individual element of the power distribution and integration mechanism 40 and an individual element of the reduction gear mechanism 50 when the motor MG2 functions as a generator and the motor MG1 functions as a motor.

FIG. 10 shows an example of an alignment chart representing a relationship of a rotation speed and a torque between an individual element of the power distribution and integration mechanism 40 and an individual element of the reduction gear mechanism 50 in the second torque conversion mode. In the second torque conversion mode, the power distribution and integration mechanism 40 and the motors MG1 and MG2 perform a torque conversion on power from the engine 22 and output the power to the sun gear 41, and the ratio between the rotation speed Ne of the engine 22 and the rotation speed of the sun gear 41 which is an output element can be changed steplessly and continuously by controlling the rotation speed of the motor MG2. It should be noted that the reference characters in FIG. 10 are the same as in FIG. 9.

As described above, according to the hybrid vehicle 20 of the present embodiment, with the change in speed ratio (speed state) of the transmission 60, the first torque conversion mode and the second torque conversion mode are alternately switched; and thus, particularly when the rotation speed Nm2 or Nm1 of the motor MG2 or MG1 which functions as a motor is increased, the rotation speed Nm1 or Nm2 of the motor MG1 or MG2 which functions as a generator can be prevented from having a negative value. Therefore, the hybrid vehicle 20 can suppress the occurrence of a power circulation in which as the rotation speed of the motor MG1 becomes negative in the first torque conversion mode, the motor MG2 uses part of the power outputted to the carrier shaft 45*a* to generate electric power and the motor MG1 consumes the electric power generated by the motor MG2 and outputs the power; and a power circulation in which as the rotation speed of the motor MG2 becomes negative in the second torque conversion mode, the motor MG1 uses part of the power outputted to the first motor shaft 46 to generate electric power and the Motor MG2 consumes the electric power generated by the motor MG1 and outputs the power; and can improve power transmission efficiency in a wider driving area. Moreover, as such a power circulation is suppressed, a maximum rotation speed of the motors MG1 and MG2 can also be suppressed, and thereby the motors MG1 and MG2 can be made compact. Further, the hybrid vehicle 20 can mechanically (directly) transmit power from the engine 22 to the drive shaft 67 at a speed ratio uniquely determined depending on the above described 1st to 2nd simultaneous engagement state, the 2nd to 3rd simultaneous engagement state, and the 3rd to 4th simultaneous engagement state. Therefore, a chance of mechanically outputting the power from the engine 22 to the drive shaft 67 without conversion to electrical energy can be increased and the power transmission efficiency can be further increased in a wider driving area. In general, according to a power output apparatus using the engine, two motors, and the differential rotation mechanism such as a planetary gear mechanism, when the reduction gear ratio between the engine and the drive shaft is relatively large, more engine power is converted to electrical energy, and thus the power transmission efficiency is deteriorated, and the motors MG1 and MG2 tend to generate heat. Therefore, the above described simultaneous engagement mode is advantageous particularly when the reduction gear ratio between the engine 22 and the drive shaft is relatively large. Further, according to the hybrid vehicle 20 of the present embodiment, before the speed ratio of the transmission 60 is changed, the simultaneous engagement mode is performed between the first torque conversion mode and the second torque conversion mode. Therefore, a so-called torque loss does not occur at the time of change in speed ratio, and the change in speed ratio, namely, the switching between the first torque conversion mode and the second torque conversion mode can be performed very smoothly and without a shock.

Figure 11:
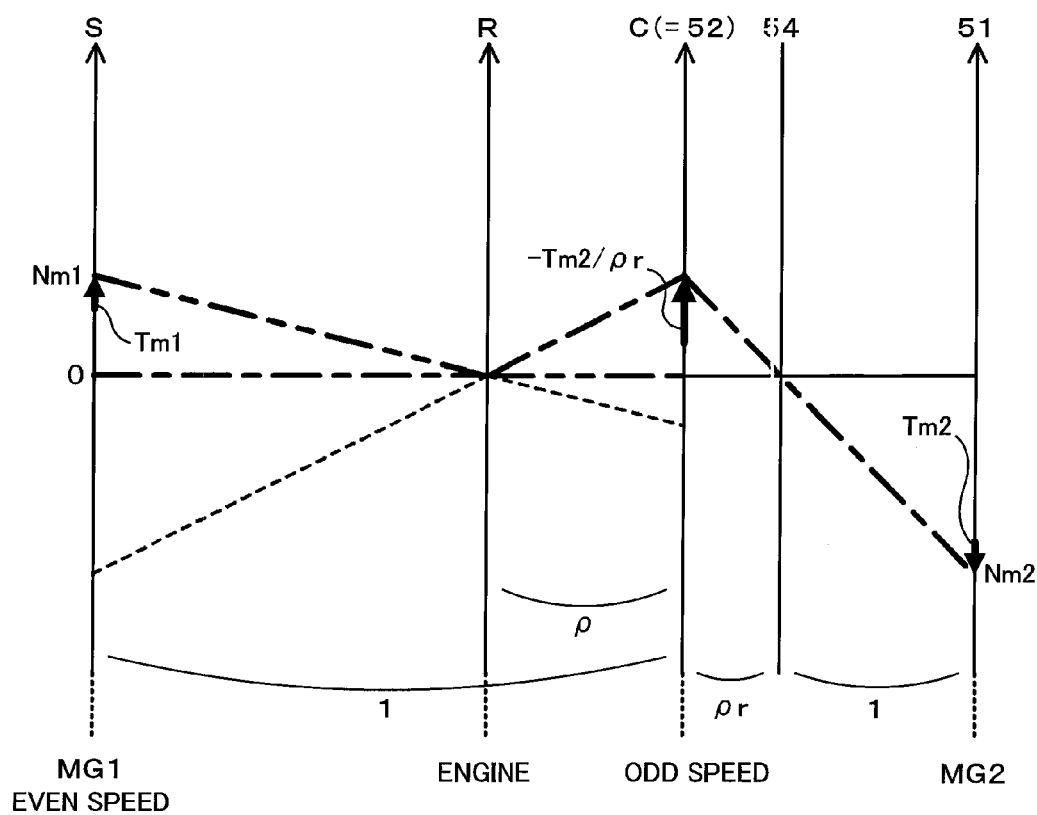
FIG. 11 is an explanatory drawing for explaining a motor drive mode in the hybrid vehicle 20 of the present embodiment.

Next, with reference to FIG. 11 and the like, the outline of the motor drive mode will be described. The motor drive mode is a mode in which, in a state of stopping the engine 22, an electric power from the battery 35 is used to cause the motor MG1 and the motor MG2 to output power, by which the hybrid vehicle 20 is driven. According to the hybrid vehicle 20 of the present embodiment, the motor drive mode is broadly classified into a clutch engagement single motor drive mode in which the clutch C0 is connected and one of the motors MG1 and MG2 is caused to output the power; a clutch release single motor drive mode in which the clutch C0 is released and one of the motors MG1 and MG2 is caused to output the power; and a 2-motor drive mode in which the clutch C0 is released and the power from both the motors MG1 and MG2 can be used.

When the clutch engagement single motor drive mode is performed, with the clutch C0 being connected, the clutch C2 of the transmission 60 is released and the clutch C1 is used to fix the first gear 61a of the first speed gear train or the third gear 63a of third speed gear train to the carrier shaft 45a to cause only the motor MG2 to output the power, or the clutch C1 of the transmission 60 is released and the clutch C2 is used to fix the second gear 62a of the second speed gear train or the fourth gear 64a of the fourth speed gear train to the first motor shaft 46 to cause only the motor MG1 to output the power. In such a clutch engagement single motor drive mode, the clutch C0 allows the sun gear 41 of the power distribution and integration mechanism 40 and the first motor shaft 46 to be connected. Therefore, the motor MG1 or MG2 which does not output power is idle by being corotated by the motor MG2 or MG1 which is outputting power (see the broken line in FIG. 11). Moreover, when the clutch release single motor drive mode is performed, the clutch C0 is released, the clutch C2 of the transmission 60 is released, and the clutch C1 is used to fix the first gear 61a of the first speed gear train or the third gear 63a of the third speed gear train to the carrier shaft 45a to cause only the motor MG2 to output power, or the clutch C1 of the transmission 60 is released, the clutch C2 is used to fix the second gear 62a of the second speed gear train or the fourth gear 64a of the fourth speed gear train to the first motor shaft 46 to cause only the motor MG1 to output power. In such a clutch release single motor drive mode, as shown by the one-dot chain line and the two-dot chain line in FIG. 11, the clutch C0 is released, and the connection between the sun gear 41 and the first motor shaft 46 is released. Therefore, the crankshaft 26 of the engine 22 which is stopped by a function of the power distribution and integration mechanism 40 is prevented from corotating. In addition, since the clutch C2 or C1 is released, the motor MG1 or MG2 which is stopped can be prevented from corotating, and thereby, power transmission efficiency can be suppressed from decreasing. When the 2-motor drive mode is performed, the clutch C0 is released, and the clutches C1 and C2 are used to set the transmission to the above described 1st to 2nd simultaneous engagement state, the 2nd to 3rd simultaneous engagement state, or the 3rd to 4th simultaneous engagement state, and then, at least one of motors MG1 and MG2 is drive-and-controlled. This can prevent the engine 22 from corotating, can cause both the motors MG1 and MG2 to output power, and can transmit a large power to the drive shaft 67 in the motor drive mode. Therefore, a so-called starting on a slope can be well performed and a good towing capability and the like at a motor drive can be well maintained.

Moreover, according to the hybrid vehicle 20 of the present embodiment, when the clutch release single motor drive mode is selected, the speed ratio (speed state) of the transmission 60 can be easily changed so as to efficiently transmit power to the drive shaft 67. For example, in the clutch release single motor drive mode, the clutch C1 of the transmission 60 is used to fix the first gear 61a of the first speed gear train or the third gear 63a of the third speed gear train to the carrier shaft 45a and causes only the motor MG2 to output power. At this time, the rotation speed of the stopped motor MG1 is synchronized with the rotation speed of the second gear 62a of the second speed gear train or the fourth gear 64a of the fourth speed gear train, and the clutch C2 is used to fix the second gear 62a or the fourth gear 64a to the first motor shaft 46. Thereby, the state can be changed to one of the above described 1st to 2nd simultaneous engagement state, the 2nd to 3rd simultaneous engagement state, and the 3rd to 4th simultaneous engagement state, namely, the 2-motor drive mode. Then, in this state, when the clutch C1 of the transmission 60 is released and only the motor MG1 is caused to output power, the power outputted from the motor MG1 can be transmitted to the drive shaft 67 through the second speed gear train or the fourth speed gear train of the transmission 60. As a result, according to the hybrid vehicle 20 of the present embodiment, even in the motor drive mode, the transmission 60 can be used to change the rotation speed of the carrier shaft 45a and the first motor shaft 46 to increase the torque. Therefore, the maximum torque required for the motors MG1 and MG2 can be decreased and thus the motors MG1 and MG2 can be made compact. Moreover, in such a motor drive mode, before the speed ratio of the transmission 60 is changed, the simultaneous engagement state of the transmission 60, namely, the 2-motor drive mode is performed, and thus, a so-called torque loss does not occur at the time of change in speed ratio, and the speed ratio can be changed very smoothly and without a shock. It should be noted that when a required driving force is increased or the state of charge (SOC) of the battery 35 is decreased in these motor drive modes, one of the motors MG1 and MG2, whichever does not output power according to the speed ratio of the transmission 60, is used to perform cranking of the engine 22, thereby starting the engine 22.

Figure 12:
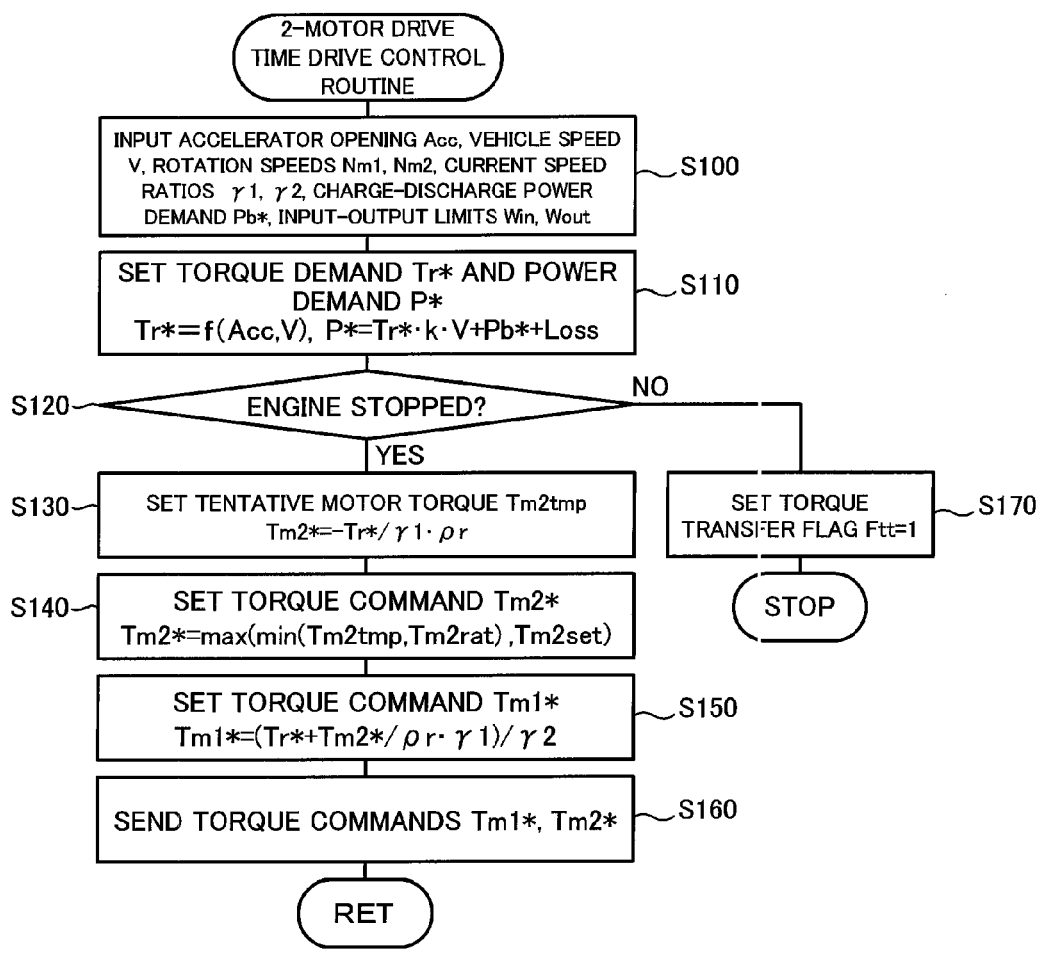
FIG. 12 is a flowchart showing an example of a 2-motor drive time drive control routine executed by a hybrid ECU 70 when a 2-motor drive mode is selected in the hybrid vehicle 20 of the present embodiment.

Subsequently, with reference to FIGS. 12 to 16, a detailed description will be given to a procedure for controlling the hybrid vehicle 20 running in the 2-motor drive mode in which the clutch C0 is released so as to use the power from both the motors MG1 and MG2. FIG. 12 is a flowchart showing an example of a 2-motor drive time drive control routine executed by the hybrid ECU 70 when the 2-motor drive mode is selected. This routine is executed every predetermined time (e.g., every several msec). It should be noted that examples of the cases in which the 2-motor drive mode is selected include a case in which the hybrid vehicle 20 starts on a slope (starting on a slope), a case in which the hybrid vehicle starts in a state of being coupled with a predetermined object to be tracked, and the like.

When the 2-motor drive time drive control routine of FIG. 12 starts, the CPU 72 of the hybrid ECU 70 executes a data input process required for control such as the accelerator opening Acc from the accelerator pedal position sensor 84; the vehicle speed V from the vehicle speed sensor 87; the rotation speeds Nm1 and Nm2 of the motors MG1 and MG2; the current speed ratios γ1 and γ2 of the first and second transmission mechanisms of the transmission 60; the charge-discharge power demand Pb*; and the input limit Win and the output limit Wout of the battery 35 (Step S100). Here, the rotation speeds Nm1 and Nm2 of the motors MG1 and MG2 are assumed to be inputted from the motor ECU 40 by communication. The current speed ratio γ1 corresponds to one of the first speed gear train and the third speed gear train, constituting the first transmission mechanism of the transmission 60, whichever is used to couple the carrier shaft 45a and the drive shaft 67 during the execution of the 2-motor drive mode. The current speed ratio γ2 corresponds to one of the second speed gear train and the fourth speed gear train, constituting the second transmission mechanism of the transmission 60, whichever is used to couple the first motor shaft 46 and the drive shaft 67 during the execution of the 2-motor drive mode. When the carrier shaft 45a or the first motor shaft 46 is coupled to the drive shaft 67, the current speed ratio γ1 or γ2 is stored in a predetermined area of the RAM 76 accordingly. Further, the charge-discharge power demand Pb* is assumed to be electric power which is inputted from the battery ECU 36 by communication, namely, the electric power which is set as electric power to be charged or discharged by or from the battery 35 by the battery ECU 36 based on the state of charge (SOC) of the battery 35, and the like. Moreover, the input limit Win as a charge allowable power which is electric power allowable to charge the battery 35 and the output limit Wout as a discharge allowable power which is electric power allowable to discharge the same are assumed to be inputted from the battery ECU 36 by communication, namely, the electric power which is set based on the battery temperature Tb of the battery 35 detected by the temperature sensor 37 and the state of charge (SOC) of the battery 35. It should be noted that the input limit Win and the output limit Wout of the battery 35 can be set by setting a basic value of the input limit Win and the output limit Wout based on the battery temperature Tb, setting an output limit correction coefficient and an input limit correction coefficient based on the state of charge (SOC) of the battery 35 and multiplying the set basic value of the input limit Win and the output limit Wout by the correction coefficient.

After the data input process in Step S100, the torque demand Tr* to be outputted to the drive shaft 67 is set based on the inputted accelerator opening Acc and the vehicle speed V, and the power demand P* required for the entire hybrid vehicle 20 is set (Step S110). According to the present embodiment, a torque demand setting map (not shown) which preliminarily defines the relationship among the accelerator opening Acc, the vehicle speed V, and the torque demand Tr* is stored in ROM 74. As the torque demand Tr*, a torque demand corresponding to a given accelerator opening Acc and a vehicle speed V is derived and set from the map. Moreover, according to the present embodiment, the power demand P* is calculated by multiplying the torque demand Tr* set in Step S110 by the vehicle speed V indicating the rotation speed of the drive shaft 67 and by a conversion factor k; and adding the product to the charge-discharge power demand Pb* (assuming the charge requesting side as positive) plus a loss (Loss). Subsequently, for example, a determination is made as to whether the engine 22 remains stopped or not based on the power demand P* set, in Step S110, the output limit Wout (or the state of charge (SOC)) inputted in Step S100, and the like (Step S120).

If a determination is made that the engine 22 remains stopped in Step S120, the torque demand Tr* set in Step S110, the current speed ratio γ1 and the reduction gear ratio ρr of the reduction gear mechanism 50 are used to calculate the tentative motor torque Tm2tmp as a torque to be outputted from the motor MG2 based on the following expression (1) (Step S130). The tentative motor torque Tm2tmp calculated in this manner is a value which is assumed to cause the motor MG2 to tentatively output all the torque demand Tr* set in Step S110. Next, the torque command Tm2* of the motor MG2 is set as a value which limits the tentative motor torque Tm2tmp by the maximum rated torque Tm2rat of the motor MG2 and a predetermined minimum output torque Tm2set (Tm2set<Tm2rat) (Step S140). Further, the following expression (2) is calculated based on the torque demand Tr* set in Step S110, the torque command Tm2* to the motor MG2 set in Step S140, the current speed ratios γ1 and γ2, and the reduction gear ratio ρr of the reduction gear mechanism 50, and then, the torque command Tm1* to the motor MG1 is set (Step S150). The torque command Tm1* set in this manner indicates an insufficient torque of a case in which the torque demand Tr* cannot be satisfied even by causing the motor MG2 to output a torque according to the torque command Tm2*. When the torque commands Tm1* and Tm2* of the motors MG1 and MG2 are set, the set torque commands Tm1* and Tm2* are sent to the motor ECU 40 (Step S160), and then, the processes following Step S100 are executed again. The motor ECU 40 which received the torque commands Tm1* and Tm2* performs switching control on the switching elements of the inverters 31 and 32 so as to allow the motors MG1 and MG2 to be driven according to the torque commands Tm1* and Tm2*. As described above, when the hybrid vehicle 20 of the present embodiment runs in the 2-motor drive mode, the motor MG2, one of the two motors MG1 and MG2, is preferentially assumed to output power. If the motor MG2 alone cannot supply the torque demand Tr*, the other motor MG1 is assumed to output the insufficient torque. This can suppress the fluctuation of the power outputted to the drive shaft 67 due to a difference in response to the torque command between the motor MG1 and the motor MG2. In addition, noise due to a carrier sound of the inverters 31 and 32 can also be reduced.

$$Tm2^* = -Tr^* / \gamma 1 \cdot \rho r \quad (1)$$

$$Tm1^* = (Tr^* + Tm2^* / \rho r \cdot \gamma 1) / \gamma 2 \quad (2)$$

On the contrary, in Step S120, when a determination is made that the engine 22 should start, one of the motors MG1 and MG2 needs to be placed in a state capable of performing cranking of the engine 22 so as to start the engine 22. For this reason, when a negative determination is made in Step S120, the torque transfer flag Ftt is set to a value of 1 so as to instruct the torque transfer routine to be executed to transfer the power from one of the motors MG1 and MG2 to the other (Step S170), and then the present routine is terminated. Then, the torque transfer routine is executed as described later.

Figure 13:
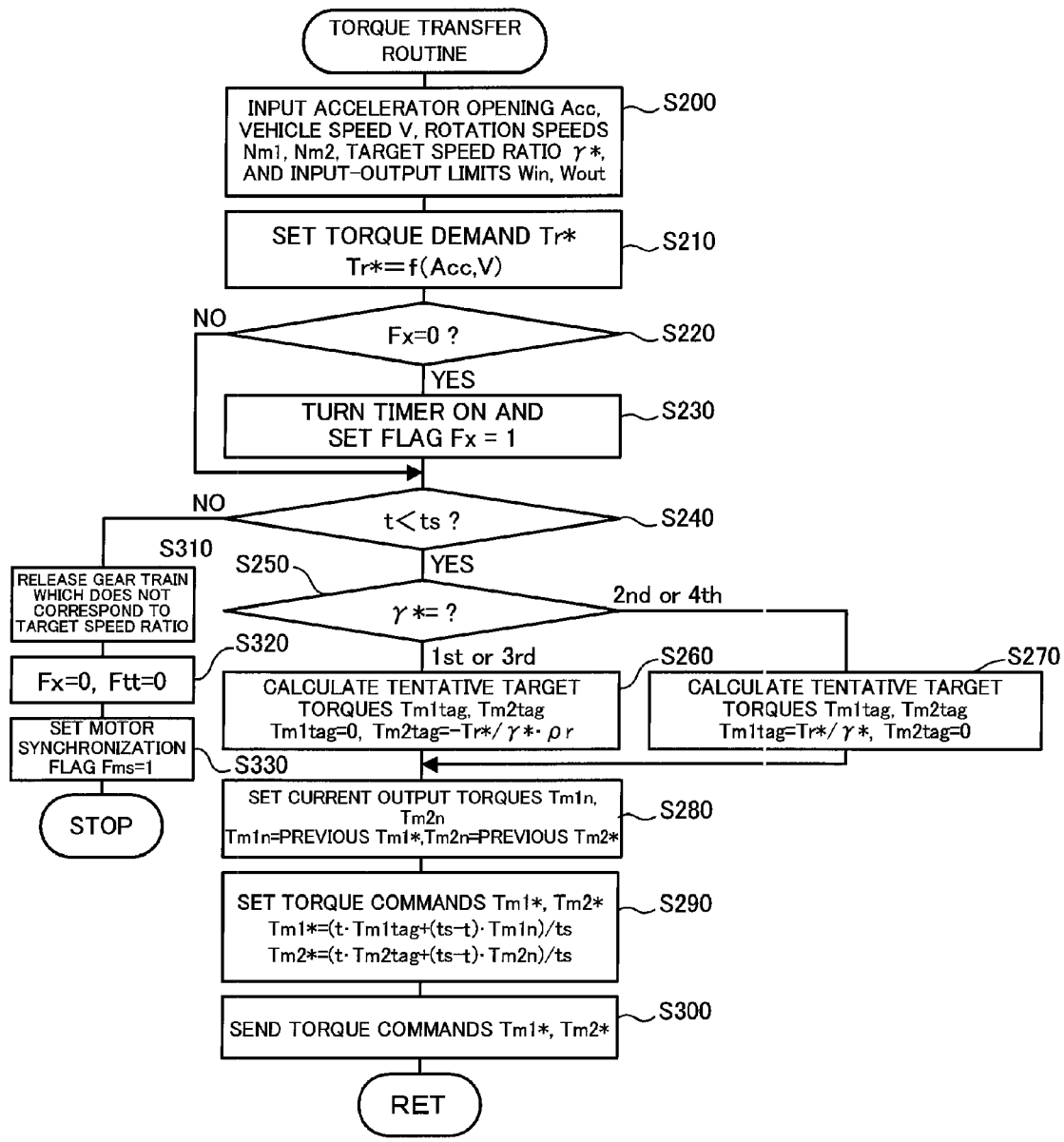
FIG. 13 is a flowchart showing an example of a torque transfer routine executed by the hybrid ECU 70 of the present embodiment.

FIG. 13 is a flowchart showing an example of a torque transfer routine executed by the hybrid ECU 70. When the torque transfer flag Ftt is set to a value of 1, this routine is executed every predetermined time (e.g., every several msec). When the torque transfer routine of FIG. 13 starts, in the same manner as in Step S100 of FIG. 12, the CPU 72 of the hybrid ECU 70 executes a data input process required for control such as the accelerator opening Acc, the vehicle speed V, the rotation speeds Nm1 and Nm2 of the motors MG1 and MG2, the target speed ratio γ* of the transmission 60, and the input limit Win and the output limit Wout of the battery 35 (Step S200). It should be noted that the target speed ratio γ* of the transmission 60 is set as a speed ratio of the transmission 60 which starts the engine 22 according to the vehicle speed V, the torque demand, and the like through the speed change process routine (not shown), and then is stored in a predetermined area of the RAM 76. Subsequently, the torque demand Tr* to be output to the drive shaft 67 is set based on the accelerator opening Acc and the vehicle speed V input in Step S200 (Step S210). Further, a determination is made as to whether the flag Fx indicating that the torque is being transferred is set to a value of 0 (Step S220). If the flag Fx is a value of 0, a predetermined timer (not shown) is turned on, and the flag Fx is set to a value of (Step S230). Then, a determination is made as to whether the time t measured by the timer is less than the predetermined torque transfer time ts (Step S240). If the time t measured by the timer is less than the torque transfer time ts, a determination is made as to which one of the first speed gear train to the fourth speed gear train corresponds to the target speed ratio $\gamma^*$ (Step S250). It should be noted that if a determination is made in Step S220 that the flag Fx is a value of 1, the process of Step S230 is skipped and the process of Step S240 is executed.

Here, the present routine is a series of processes of decreasing the power from one of motors MG1 and MG2 and increasing the power from the other motor thereof so that at the time when the above torque transfer time ts has elapsed since the routine started, the power from one of the motors MG1 and MG2, whichever does not correspond to the target speed, ratio $\gamma^*$ become a value of 0, and the power outputted from the other one of the motors MG2 and MG1 becomes a value based on the torque demand Tr* and the target speed ratio $\gamma^*$. For this reason, when the determination process in Step S240 is executed, first, calculation is made on the tentative target torques Tm1tag and Tm2tag which should be outputted by the motors MG1 and MG2 when the torque transfer is completed based on the target speed ratio $\gamma^*$, the torque demand Tr* at a point of time, and the like. That is, if the target speed ratio $\gamma^*$ corresponds to the first speed gear train or the third speed gear train, when the engine 22 starts, the carrier shaft 45a is coupled to the drive shaft 67 to cause only the motor MG2 to output power and to cause the motor MG1 to perform cranking of the engine 22. Therefore, the tentative target torque Tm1tag of the motor MG1 is set to a value of 0, and the torque demand Tr* set in Step S210 as well as the target speed ratio $\gamma^*$ and the reduction gear ratio $\rho r$ of the reduction gear mechanism 50 are used to calculate the tentative target torque Tm2tag of the motor MG2 by the following expression (3) (Step S260). If the target speed ratio $\gamma^*$ corresponds to the second speed gear train or the fourth speed gear train, when the engine 22 starts, the first motor shaft 46 is coupled to the drive shaft 67 to cause only the motor MG1 to output power and to cause the motor MG2 to perform cranking of the engine 22. Therefore, the tentative target torque Tm2tag of the motor MG2 is set to a value of 0, and the torque demand Tr* set in Step S210 and the target speed ratio $\gamma^*$ are used to calculate the tentative target torque Tm1tag of the motor MG1 by the following expression (4) (Step S270). After the process in Step S260 or S270 is executed, the previous torque command value to the motors MG1 and MG2 is set as the current output, torques Tm1n and Tm2n which are outputted by the motors MG1 and MG2 at the point of time (Step S280). The following expressions (5) and (6) are calculated based on the tentative target torques Tm1tag and Tm2tag calculated in Step S270 and the current output torques Tm1n and Tm2n set in Step S280, and the torque commands Tm1* and Tm2* to the motors MG1 and MG2 are set (Step S290). Then, the set torque commands Tm1* and Tm2* are sent to the motor ECU 40 (Step S300). Then, the processes following Step S200 are executed again.

$$Tm2\text{tag} = -Tr^*/\gamma^* \cdot \rho r \quad (3)$$

$$Tm1\text{tag} = Tr^*/\gamma^* \quad (4)$$

$$Tm1^* = (t \cdot Tm1\text{tag} + (ts-t) \cdot Tm1n)/ts \quad (5)$$

$$Tm2^* = (t \cdot Tm2\text{tag} + (ts-t) \cdot Tm2n)/ts \quad (6)$$

When the above described process is repeatedly executed, the torque commands Tm1* and Tm2* to the motors MG1 and MG2 are set so as to output power based on the torque demand Tr* set to the drive shaft 67 based on the power outputted by the motors MG1 and MG2 every predetermined time (execution cycle of the present routine), the torque demand Tr*, and the target speed ratio $\gamma^*$ as well as to complete the power transfer within the torque transfer time ts. Thereby, even if the torque demand Tr* is changed during the execution of the torque transfer routine, power based on the torque demand Tr* can be more reliably outputted to the drive shaft 67 and the power can be transferred between the motors MG1 and MG2. If a determination is made in Step S240 that the time t measured by the timer is equal to or greater than the torque transfer time ts, that means that the power transfer between the motors MG1 and MG2 has been completed. Therefore, at this stage, the actuator 88 is drive-and-controlled so as to release the coupling between the first motor shaft 46 or the carrier shaft 45a and one of the first to the fourth speed gear trains, whichever does not correspond to the target speed ratio $\gamma^*$, by the clutch C1 or C2 of the transmission 60 (Step S310). By doing so, the motor MG1 or MG2 used for cranking of the engine 22 can be disconnected from the drive shaft 67, and the change of the speed ratio (speed state) of the transmission 60 assuming the speed ratio as the target speed ratio $\gamma^*$ can be completed. It should be noted that at this stage, the target speed ratio $\gamma^*$ up to the point of time is stored as the current speed ratio $\gamma$ in a predetermined storage area of the RAM 76. Then, the above flag Fx and the torque transfer flag Ftt are set to a value of 0 (Step S320). At this stage, the clutch C0 is released, and the motors MG1 and MG2 are substantially disconnected from the engine 22. Therefore, in order to start the engine 22, a process of connecting the clutch C0 needs to be executed before starting the engine 22. For this reason, after the process in Step S320, a predetermined motor, synchronization flag Fms is set to a value of 1 so as to be able to connect the clutch C0 (Step S330). Then, the present routine is terminated and the execution of a motor synchronization control routine described below is started.

Figure 14:
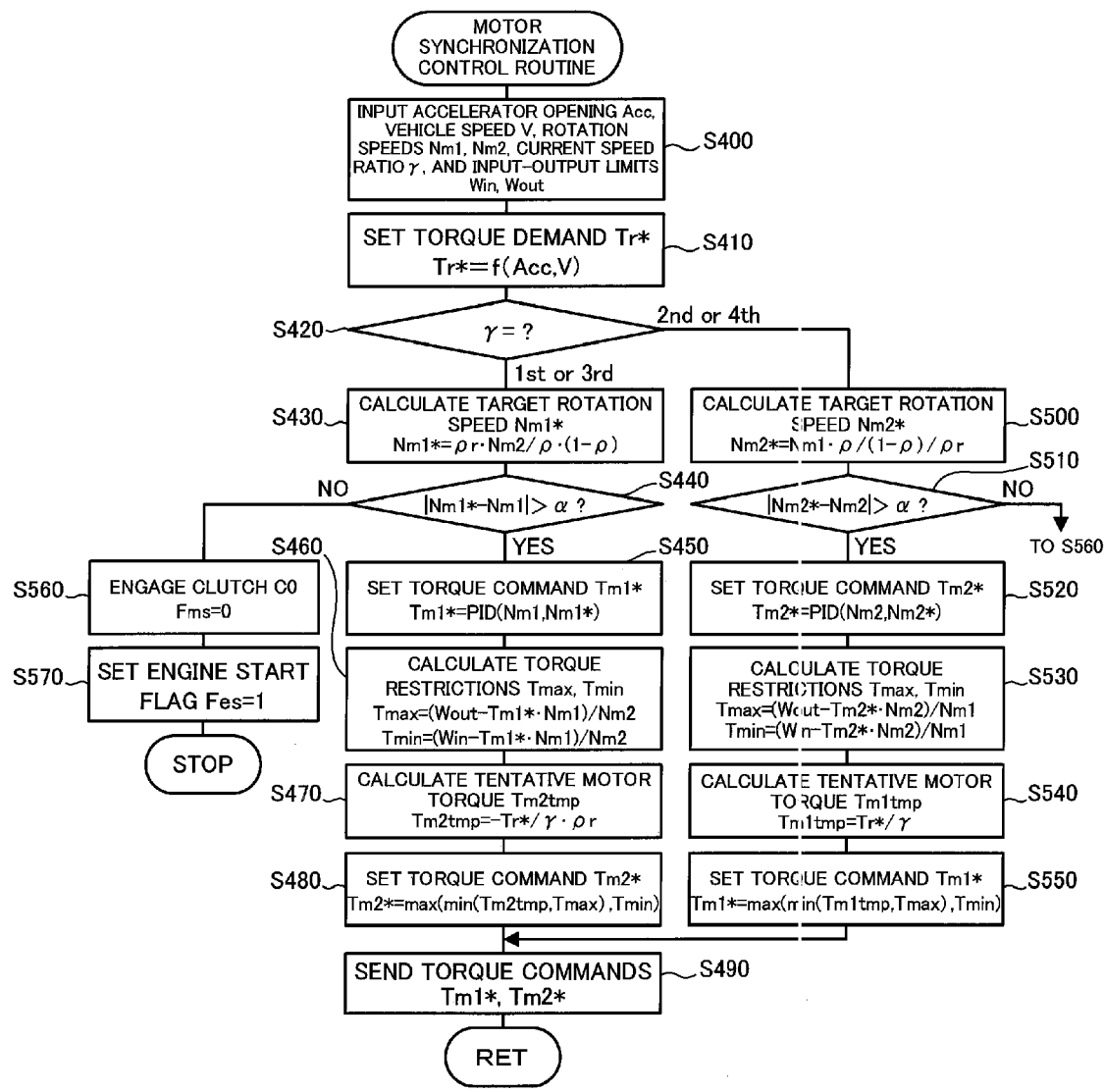
FIG. 14 is a flowchart showing an example of a motor synchronization control routine executed by the hybrid ECU 70 of the present embodiment.

FIG. 14 is a flowchart showing an example of a motor synchronization control routine executed by the hybrid ECU 70. When the motor synchronization flag Fms is set to a value of 1, this routine is executed every predetermined time (e.g., every several msec). When the motor synchronization control routine of FIG. 14 starts, the CPU 72 of the hybrid ECU 70 executes a data input process required for control such as the accelerator opening Acc, the vehicle speed V, the rotation speeds Nm1 and Nm2 of the motors MG1 and MG2, the current speed ratio $\gamma$ of the transmission 60, and the input limit Win and the output limit Wout of the battery 35 (Step S400). Then, the torque demand Tr* to be outputted to the drive shaft 67 is set (Step S410). Further, a determination is made as to which one, of the first speed gear train to the fourth speed gear train corresponds to the current speed ratio $\gamma$ (target speed ratio $\gamma^*$ when the torque transfer routine is executed) (Step S420).

If the current speed ratio $\gamma$ corresponds to the first speed gear train or the third speed gear train, the carrier shaft 45a is coupled to the drive shaft 67 by the transmission 60, and only the motor MG2 outputs power. Since the clutch C0 is released, the rotation speed Nm1 of the motor MG1 (first motor shaft 46) is different from the rotation speed of the sun gear 41 of the power distribution and integration mechanism 40 at the point of time when the clutch C0 is engaged. For this reason, if the current speed ratio $\gamma$ corresponds to the first speed gear train or the third speed gear train, in order to rotatably synchronize the motor MG1, namely, the first motor shaft 46 with the sun gear 41 of the power distribution and integration mechanism 40, the rotation speed Nm2 of the motor MG2, the gear ratio ρ of the power distribution and integration mechanism 40, and the reduction gear ratio ρr of the reduction gear mechanism 50 inputted in Step S400 are used to calculate the target rotation speed Nm1* of the motor MG1 by the following expression (7) (Step S430). The expression (7) is an expression for matching the rotation speed Nm1 of the motor MG1 (second motor) which is released from the coupling state with the drive shaft 67, with the rotation speed of the sun gear (second element) 41 at the time of drive source element connection based on the rotation speed Nm2 of the motor MG2 (first motor) coupled with the drive shaft 67, and can be easily derived from the alignment chart of FIG. 9. After the target rotation speed Nm1* of the motor MG1 is calculated, a determination is made as to whether the absolute value of a deviation between the target rotation speed Nm1* and the rotation speed Nm1 of the motor MG1 inputted in Step S400 is greater than a predetermined value α (Step S440). If the absolute value is greater than the predetermined value α, the calculation of the following expression (8) is executed based on the target rotation speed Nm1* calculated in Step S430 and the rotation speed Nm1 of the motor MG1 to set the torque command Tm1* of the motor MG1 (Step S450). It should be noted that the expression (8) is a relational expression in feedback control for rotating the motor MG1 at the target rotation speed Nm1*; in the expression (8), "k11" the first term on the right-hand side is a gain of the proportional term; and "k12" of the second term on the right-hand side is a gain of the integral term. Then, a deviation between the input limit Win and, the output limit Wout of the battery 35 and the power consumption (generated electric power) of the motor MG1 obtained as a product between the torque command Tm1* of the motor MG1 set in S450 and the current rotation speed Nm1 of the motor MG1 is divided by the rotation speed Nm2 of the motor MG2. By doing so, calculation is made on the torque restrictions Tmin and Tmax as the upper and lower limits of a torque which may be outputted from the motor MG2 (Step S460). Further, the tentative motor torque Tm2tmp as a torque to be outputted from the motor MG2 is calculated by the above expression (1) (Step S470). The torque command Tm2* of the motor MG2 is set as a value limiting the tentative motor torque Tm2tmp by the torque restrictions Tmin and Tmax calculated in Step S460 (Step S480). Setting the torque command Tm2* of the motor MG2 in this manner allows a torque to be outputted from the motor MG2 to be set as a torque restrictioned within the input limit Win and the output limit Wout of the battery 35. After the torque commands Tm1* and Tm2* of the motors MG1 and MG2 are set, the set torque commands Tm1* and Tm2* are sent to the motor ECU 40 (Step S490). Then, the processes following Step S400 are executed again.

$$Nm1^* = \rho r \cdot Nm2 / \rho \cdot (1-\rho) \quad (7)$$

$$Tm1^* = k11(Nm1^* - Nm1) + k12\int(Nm1^* - Nm1)dt \quad (8)$$

On the contrary, if the current speed ratio γ corresponds to the second speed gear train or the fourth speed gear train, the first motor shaft 46 is coupled to the drive shaft 67 by the transmission 60, and only the motor MG1 outputs power. Since the clutch C0 is released, the rotation speed (=ρr×Nm2) of the carrier shaft 45a is different from the rotation speed of the carrier 45 of the power distribution and integration mechanism 40 at the time when the clutch C0 is engaged. For this reason, if the current speed ratio γ corresponds to the second speed gear train or the fourth speed gear train, in order to synchronize (correspond to) the rotation speed Nm2 of the motor MG2 with the rotation speed of the carrier 45 at the time when the clutch C0 is engaged, the rotation speed Nm1 of the motor MG1, the gear ratio ρ of the power distribution and integration mechanism 40, and the reduction gear ratio ρr of the reduction gear mechanism 50 inputted in Step S400 are used to calculate the target rotation speed Nm2* of the motor MG2 by the following expression (9) (Step S500). The expression (9) is an expression for matching the rotation speed Nm2 of the motor MG2 (first motor) which is released from the coupling state with the drive shaft 67, with the rotation speed of the carrier (first element) 45 at the time of drive source element connection based on the rotation speed Nm1 of the motor MG1 (second motor) coupled with the drive shaft 67, and can be easily derived from the alignment chart of FIG. 10. After the target rotation speed Nm2* of the motor MG2 is calculated, a determination is made as to whether the absolute value of a deviation between the target rotation speed Nm2* and the rotation speed Nm2 of the motor MG2 inputted in Step S400 is greater than a predetermined value α (Step S510). If the absolute value is greater than the predetermined value α, the calculation of the following expression (10) is executed based on the target rotation speed Nm2* calculated in Step S500 and the rotation speed Nm2 of the motor MG2 to set the torque command Tm2* of the motor MG2 (Step S520). It should be noted that the expression (10) is a relational expression in feedback control for rotating the motor MG2 at the target rotation speed Nm2*; in the expression (10), "k21" of the first term on the right-hand side is a gain of the proportional term; and "k22" of the second term on the right-hand side is a gain of the integral term. Then, a deviation between the input limit Win and the output limit Wout of the battery 35 and the power consumption (generated electric power) of the motor MG2 obtained as a product between the torque command Tm2* of the motor MG2 set in S520 and the current rotation speed Nm2 of the motor MG2 is divided by the rotation speed Nm1 of the motor MG1. By doing so, calculation is made on the torque restrictions Tmin and Tmax as the upper and lower limits of a torque which may be outputted from the motor MG1 (Step S530). Further, the tentative motor torque Tm1tmp as a torque to be outputted from the motor MG1 is calculated by the above expression (2) (Step S540). The torque command Tm1* of the motor MG1 is set as a value limiting the tentative motor torque Tm2tmp by the torque restrictions Tmin and Tmax calculated in Step S530 (Step S550). After the torque commands Tm1* and Tm2* of the motors MG1 and MG2 are set, the set torque commands Tm1* and Tm2* are sent to the motor ECU 40 (Step S490). Then, the processes following Step S400 are executed again.

$$Nm2^* = Nm1 \cdot \rho / (1-\rho) / \rho r \quad (9)$$

$$Tm2^* = k21(Nm2^* - Nm2) + k22\int(Nm2^* - Nm2)dt \quad (10)$$

Figure 15:
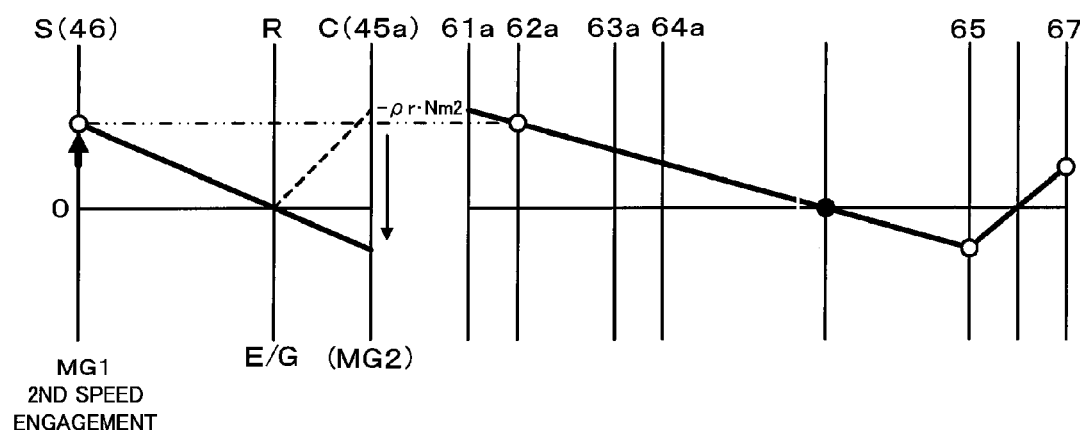
FIG. 15 is an explanatory drawing for explaining an operation when the motor synchronization control routine is executed.

As described above, the present routine is a process of matching the rotation speed Nm1 or Nm2 of the motor MG1 or MG2 which is released from the coupling state with the drive shaft 67, with the rotation speed of the sun gear 41 or the carrier 45 at the time of drive source element connection based on the rotation speed Nm2 or Nm1 of the motor MG2 or MG1 which is coupled to the drive shaft 67 (see FIG. 15). When the above described processes are repeatedly executed, the rotation speed Nm1 or Nm2 of one of the motors MG1 and MG2 is substantially matched with the target rotation speed Nm1* or Nm2*, and thus a negative determination is made in Step S440 or S510. At a stage in which a negative determination is made in Step S440 or S510, the rotation speed Nm1 of the motor MG1 and the rotation speed Nm2 of the motor MG2 indicate a relationship at the time when the clutch C0 is engaged (see FIG. 15). The actuator 88 is drive-and-controlled so as to connect the sun gear 41 of the power distribution and integration mechanism 40 to the first motor shaft 46 by the clutch C0, and the motor synchronization flag Fms is set to a value of 0 (Step S560). Then, in order to start the engine 22 by cranking using one of the motors MG1 and MG2, the engine start flag Fes is set to a value of 1 (Step S570). Then, the present routine is terminated, and then, the execution of an engine start time drive control routine described later is started.

Figure 16:
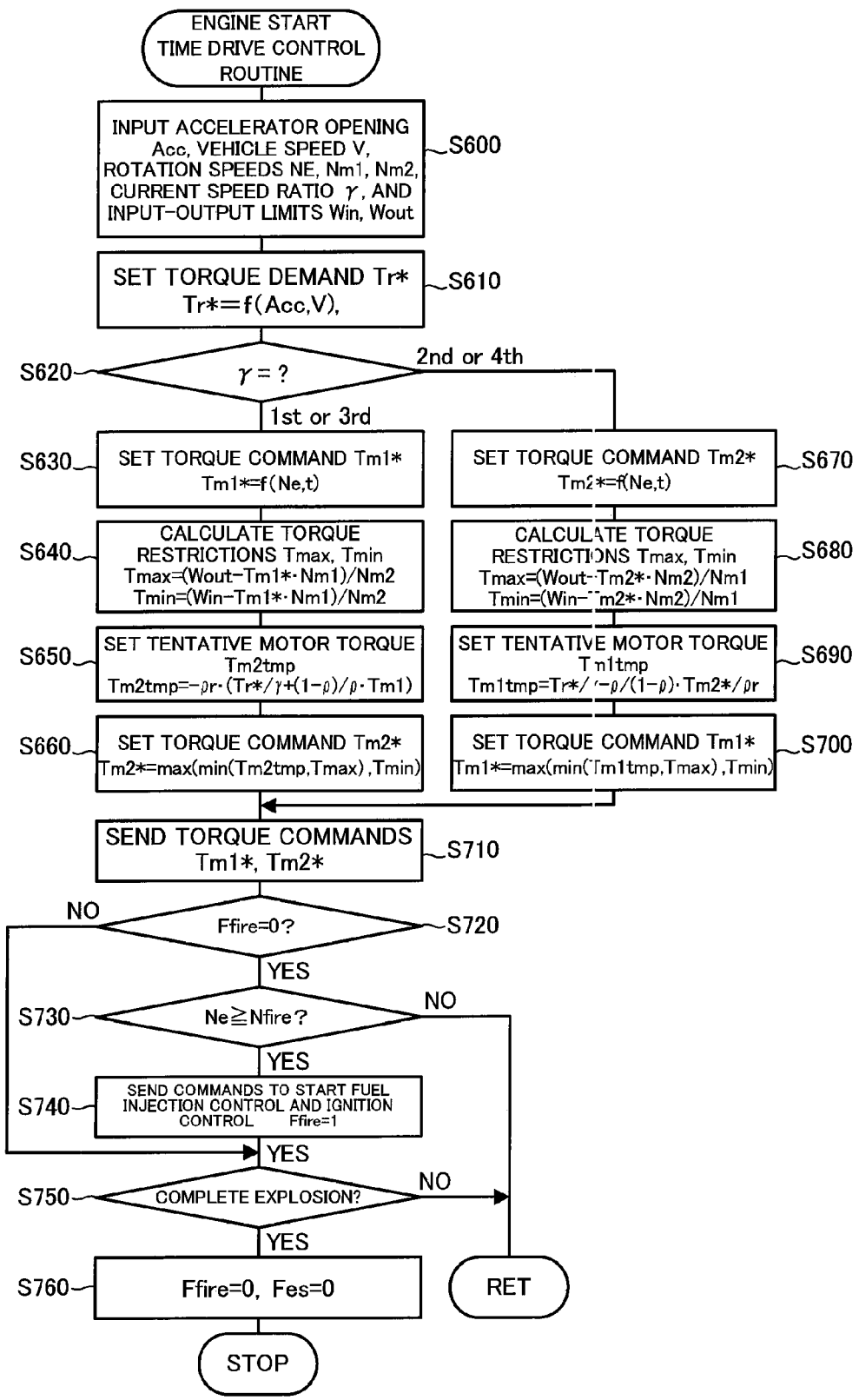
FIG. 16 is a flowchart showing an example of an engine start time drive control routine executed by the hybrid ECU 70 of the present embodiment.

FIG. 16 is a flowchart showing an example of the engine start time drive control routine executed by the hybrid ECU 70. When the engine start flag Fes is set to a value of 1, this routine is executed every predetermined time (e.g., every several msec). When the engine start time drive control routine of FIG. 16 starts, the CPU 72 of the hybrid ECU 70 executes a data input process required for control such as the accelerator opening Acc, the vehicle speed V, the rotation speed Ne of the engine 22 (crankshaft 26), the rotation speeds Nm1 and Nm2 of the motors MG1 and MG2, the current speed ratio γ of the transmission 60, and the input limit Win and the output limit Wout of the battery (Step S600). It should be noted that the rotation speed Ne of the engine 22 is assumed such that a value calculated based on a signal from a crank position sensor (not shown) attached to the crankshaft 26 is input from the engine ECU 24 through communication. After the data input process in Step S600, the torque demand Tr* is set based on the input accelerator opening Acc and the vehicle speed V (Step S610). Further, a determination is made as to which one of the first speed gear train to the fourth speed gear train corresponds to the current speed ratio γ (Step S620).

If the current speed ratio γ corresponds to the first speed gear train or the third speed gear train, which means the carrier shaft 45a is coupled to the drive shaft 67 by the transmission 60, the motor MG1 is used to crank the engine 22: Therefore, a predetermined cranking torque setting map (not shown) is used to set the torque command Tm1* of the motor MG1 as a cranking torque for cranking the engine 22 according to the rotation speed Ne of the engine 22 inputted in Step S600 and the elapsed time t since the present routine started (Step S630). Moreover, if the current speed ratio γ corresponds to the second speed gear train or the fourth speed gear train, which means the first motor shaft 46 is coupled to the drive shaft 67 by the transmission 60, the motor MG2 is used to crank the engine 22. Therefore, the above cranking torque setting map is used to set the torque command Tm2* of the motor MG2 as a cranking torque for cranking the engine 22 according to the rotation speed Ne of the engine 22 inputted in Step S600 and the elapsed time t since the present routine started (Step S670). The cranking torque setting map used in Steps S630 and S670 specifies the relationship among the torque commands Tm1* and Tm2* of the motors MG1 and MG2, the rotation speed Ne of the engine 22, and the elapsed time t since the start thereof when the engine 22 starts by cranking. According to the present embodiment, the cranking torque setting map is preliminarily created so as to set a relatively large torque as the torque commands Tm1* and Tm2* using a rate process to rapidly increase the rotation speed Ne of the engine 22 immediately after the present routine started, as well as so as to set a torque capable of stably motoring the engine 22 at a predetermined rotation speed or more as the torque commands Tm1* and Tm2* after the rotation speed Ne of the engine 22 passed the resonance rotation speed region or the time required to pass the resonance rotation speed region elapsed, further so as to reduce the torque commands Tm1* and Tm2* up to a value of 0 using the rate process after the rotation speed Ne of the engine 22 reached the predetermined rotation speed. If such a cranking torque setting map is used, a vibration which can occur when the engine 22 starts can be well suppressed.

After the torque command Tm1* of the motor MG1 is set in Step S630, in the same manner as in Step S460 of FIG. 14, the torque restrictions Tmax and Tmin are calculated as the upper and lower limits of a torque which may be outputted from the motor MG2 (Step S640). Further, the torque demand Tr*, the torque command Tm1*, the gear ratio ρ of the power distribution and integration mechanism 30, the reduction gear ratio ρr of the reduction gear mechanism 50 are used to calculate the tentative motor torque Tm2tmp as a torque to be outputted from the motor MG2 by the expression (11) (Step S650). It should be noted that the expression (11) can be easily derived from the alignment chart of FIG. 9. Then, the torque command Tm2* of the motor MG2 is set by limiting the calculated tentative motor torque Tm2tmp with the torque restrictions Tmax and Tmin calculated in Step S640 (Step S660). Moreover, after the torque command Tm2* of the motor MG2 is set in Step S670, in the same manner as in Step S530 of FIG. 14, the torque restrictions Tmax and Tmin is calculated as the upper and lower limits of a torque which may be outputted from the motor MG1 (Step S680). Further, the torque demand Tr*, the torque command Tm2*, the gear ratio ρ of the power distribution and integration mechanism 30, and the reduction gear ratio ρr of the reduction gear mechanism 50 are used to calculate the tentative motor torque Tm1tmp as a torque to be outputted from the motor MG1 by the expression (12) (Step S690). It should be noted that the expression (12) can be easily derived from the alignment chart of FIG. 10. Then, the torque command Tm1* of the motor MG1 is set by limiting the calculated tentative motor torque Tm1tmp with the torque restrictions Tmax and Tmin calculated in Step S680 (Step S700).

$$Tm2tmp = -\rho r \cdot (Tr^*/\gamma + (1-\rho)/\rho \cdot Tm1) \qquad (11)$$

$$Tm1tmp = Tr^*/\gamma - \rho/(1-\rho) \cdot Tm2^*/\rho r \qquad (12)$$

After the torque commands Tm1* and Tm2* are set as described above, the set torque commands Tm1* and Tm2* are sent to the motor ECU 40 (Step S710). Then, a determination is made as to whether the fuel injection start flag Ffire is set to a value of 0 or not (Step S720). It should be noted that the flag Ffire is set to a value of 0 before the fuel injection control or the ignition control for the engine 22 starts; and the flag Ffire is set to a value of 1 when the fuel injection control or the ignition control starts. If the fuel injection start flag Ffire is set to a value of 0, further, a determination is made as to whether the rotation speed Ne of the engine 22 reaches the threshold Nfire (Step S730). The threshold Nfire indicates a rotation speed of the engine 22 when the fuel injection control and the ignition control of the engine 22 start, for example, a value of 1000 to 1200 rpm. If the rotation speed Ne of the engine 22 does not reach the threshold Nfire, the processes following the above Step S600 are executed again. If the rotation speed Ne of the engine 22 reaches the threshold Nref, the commands to start the fuel injection control and the ignition control are sent to the engine ECU 24, and the fuel injection start flag Ffire is set to a value of 1 (Step S740). Then, a determination is made as to whether the engine 22 has reached its complete explosion (Step S750). If the engine 22 has not reached its complete explosion, the processes following Step S600 are executed again. It should be noted that if the fuel injection start flag Ffire is set to a value of 1 in Step S740, a determination is made in Step S720 that the fuel injection start flag Ff is set to a value of 1, the processes in Steps S730 and S740 are skipped, and a determination is made as to whether the engine 22 has reached its complete explosion (Step S650). If the engine 22 has reached its complete explosion, the fuel injection start flag Ffire and the engine start flag Fes are set to a value of 0 respectively (Step S760), and then, the present routine is terminated. When the engine 22 is started in this manner, the hybrid ECU 70 starts executing a drive and control routine for driving the hybrid vehicle 20 with an operation of the engine 22.

As described above, according to the hybrid vehicle 20 of the present embodiment, the drive source element connection, which is a connection between the sun gear 41 of the power distribution and integration mechanism 40 and the first motor shaft 46 by the clutch C0, is released. In this state, the engine 22 is stopped, and the transmission 60 is used to couple both the motors MG1 and MG2 to the drive shaft 67. By doing so, in the 2-motor drive mode, the engine 22 can be prevented from corotating, and power from at least one of the motors MG1 and MG2 can be transmitted to the drive shaft 67 at a predetermined fixed speed ratio. This state allows a larger power to be outputted to the drive shaft 67 in comparison with the state in which only one of the motors MG1 and MG2 outputs power. Then, the 2-motor drive time drive control routine of FIG. 12 is executed. At this time, power from at least one of the motors MG1 and MG2 is transmitted to the drive shaft 67 at a predetermined fixed speed ratio. Then, if a determination is made in Step S120 of FIG. 12 that an engine start condition is established, control is made so as to output the power based on the torque demand Tr* to the drive shaft 67, and at the same time, in a state in which the drive source element connection by the clutch C0 is released, control is made so as to output the power based on the torque demand Tr* to the drive shaft 67. Then, the torque transfer routine (FIG. 13) is executed as a power transfer process of transferring power from one of the motors MG1 and MG2 to the other motor. Then, in order to release the coupling between the first motor shaft 46 or the carrier shaft 45a and one of the first to fourth speed gear trains which does not correspond to the target speed ratio γ* by the clutch C1 or C2 of the transmission 60, the actuator 88 is drive-and-controlled to release the coupling between one of the motors MG1 and MG2 and the drive shaft 67 by the transmission 60 (Step S310 of FIG. 13). Further, the motor synchronization control routine (FIG. 14) is executed as a rotation speed adjustment process of adjusting the rotation speed of one of the motors MG1 and MG2 which is released from the coupling to the drive shaft 67 so as to enable the above drive source element connection while power based on the torque demand Tr* can be outputted to the drive shaft 67. Then, the drive source element connection can be executed by engaging the clutch C0 (Step S560 of FIG. 14). Then, in such a state of drive source element connection, the engine start time drive control routine of FIG. 16 is executed. Then, power based on the torque demand Tr* can be outputted to the drive shaft 67, and in this state, the engine 22 can be started by causing one of the motors MG1 and MG2 to crank the engine 22. As a result, according to the hybrid vehicle 20, in a state in which drive source element connection is released, the engine 22 is stopped, and power from at least one of the motors MG1 and MG2 is being transmitted to the drive shaft 67 by the transmission 60 at a predetermined fixed speed ratio; and, in this state, if an engine start condition is established, the engine 22 can be started by more properly outputting power based on the torque demand Tr* to the drive shaft 67. Therefore, the hybrid vehicle 20 can well improve fuel consumption and drive performance by appropriately switching between the 2-motor drive mode in which power from at least one of the motors MG1 and MG2 is transmitted to the drive shaft 67 at a predetermined fixed speed ratio and a mode in which power is outputted to the drive shaft 67 with an operation of the engine 22.

Moreover, the torque transfer routine of FIG. 13 as a power transfer process is a process of setting the torque commands Tm1* and Tm2* to the motors MG1 and MG2 so as to output power based on the torque demand Tr* to the drive shaft 67 every predetermined time based on the current output torques Tm1n and Tm2n of the motors MG1 and MG2, the torque demand Tr*, and the target speed ratio γ*, as well as to complete the power transfer within the torque transfer time ts. Thereby, according to the hybrid vehicle 20, even if the torque demand Tr* is changed during the execution of the torque transfer routine, power can be transferred between the motors MG1 and MG2 while the power based on the set torque demand Tr* is more reliably outputted to the drive shaft 67. It should be noted that the torque transfer routine may be a process of decreasing power from one of the motors MG1 and MG2 and increasing power from the other one of the motors MG1 and MG2 so that the power outputted from one of the motors MG1 and MG2 becomes a value of 0 at the time when torque transfer time is has elapsed since its start, as well as the power outputted from the other one of the motors MG1 and MG2 becomes a value based on the torque demand Tr* and the target speed ratio γ* (the speed ratio of the transmission 60 after the coupling between the motor MG1 or MG2 and the drive shaft 67 is released in step S310 of FIG. 13, namely, when the engine 22 is started). Therefore, the hybrid vehicle 20 may be configured to execute the torque transfer routine illustrated in FIG. 17 instead of the torque transfer routine of FIG. 13.

Figure 17:
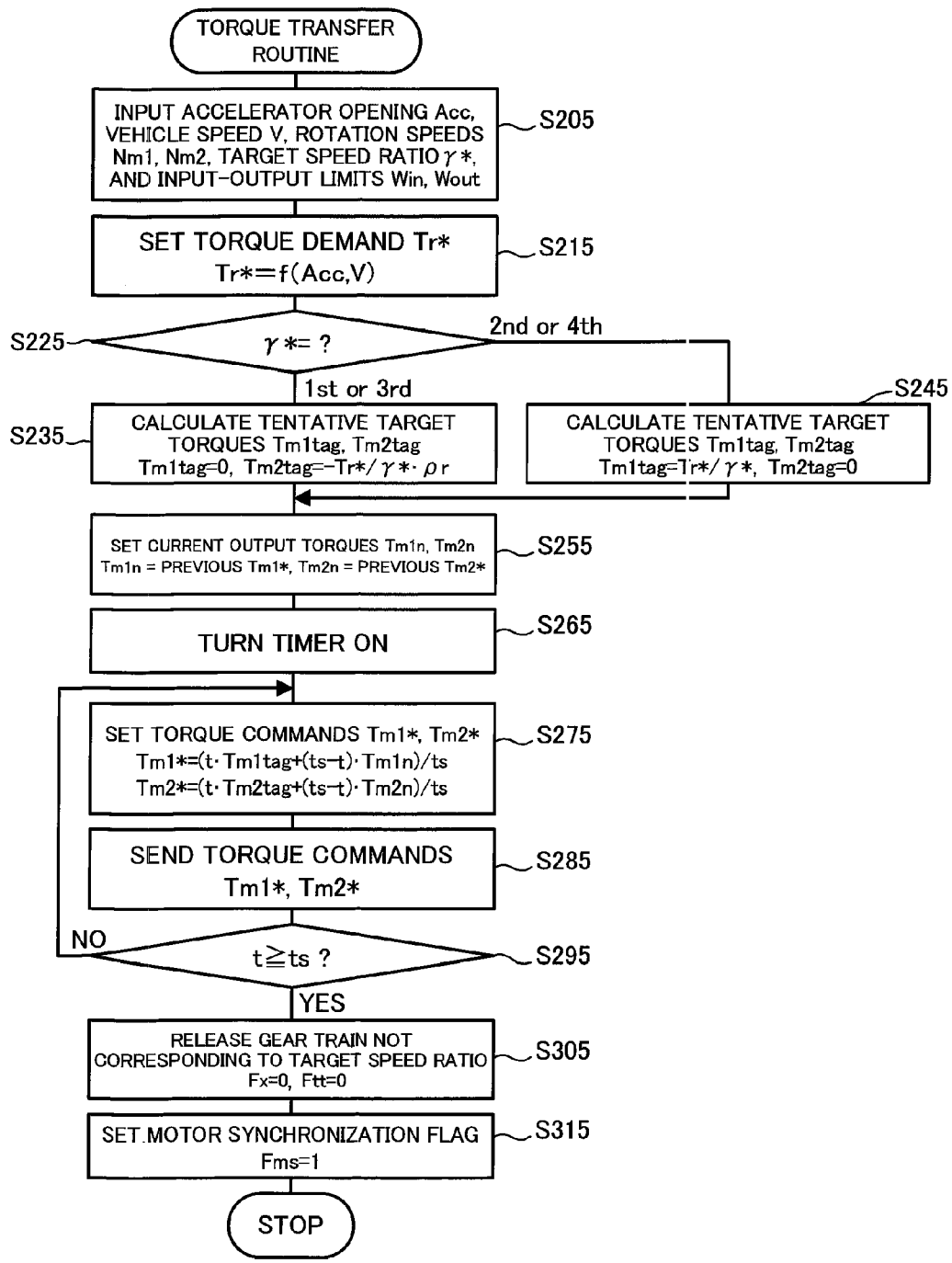
FIG. 17 is a flowchart showing an example of a variation of the torque transfer routine.

When the torque transfer routine of FIG. 17 is executed, first, the data input process (Step S205) and the torque demand Tr* setting process (Step S215) are executed in the same manner as in Steps S200 and S210 of FIG. 13 respectively. Further, in the same manner as in Steps S250, S260, S270, and S280 of FIG. 13, execution is performed to determine the target speed ratio γ* (Step S225), to set the tentative target torques Tm1tag and Tm2tag (Step S235 or S245), and to set the current output torques Tm1n and Tm2n (Step S255). After the process of Step S255, the timer is turned on (Step S265). Afterward, until the time t measured by the timer is equal to or greater than the torque transfer time ts in Step S295, execution is repeatedly performed to set the torque commands Tm1* and Tm2* (Step S275) based on the tentative target torques Tm1tag and Tm2tag, the current output torques Tm1n and Tm2n, and the like at the time when the present routine started, which were set in Steps S235 to S255, and to send the torque commands Tm1* and Tm2* (Step S285). Then, the actuator 88 is drive-and-controlled so as to release the coupling between the first motor shaft 46 or the carrier shaft 45a and one of the first to fourth speed gear trains which does not correspond to the target speed ratio γ* at the time when the torque transfer time ts has elapsed since the present routine Started, and the flags Fx and Ftt are set to a value of 0 respectively (Step S305). Further, the motor synchronization flag Fms is set to a value of 1 (Step S315), and the present routine is terminated. As described above, the torque transfer routine as a power transfer process may be a process of setting the torque commands to the motors MG1 and MG2 so as to complete the power transfer within the torque transfer time ts based on the current output torques Tm1n and Tm2n of the motors MG1 and MG2 at the time of its start, the torque demand Tr*, and the target speed ratio γ*. This can suppress the fluctuation of the power outputted to the drive shaft 67 due to a difference in response to the torque command between the motor MG1 and the motor MG2 and can transfer the power between the motor MG1 and the motor MG2.

Further, the transmission 60 of the present embodiment is a parallel shaft-type transmission including a first transmission mechanism having the first speed gear train and the third speed gear train, which is a parallel shaft-type gear train capable of coupling the carrier 45 which is a first element of the power distribution and integration mechanism 40, to the drive shaft 67; and a second transmission mechanism having the second speed gear train and the fourth speed gear train, which is a parallel shaft-type gear train capable of coupling the first motor shaft 46 of the motor MG1 to the drive shaft 67. Therefore, such a transmission 60 can selectively couple one of or both of the first motor shaft 46 of the motor MG1 and the carrier 45 (carrier shaft 45a) to the drive shaft 67. It should be noted that the hybrid vehicle 20 of the present embodiment may adopt a planetary gear transmission in stead of the parallel shaft-type transmission 60.

Figure 18:
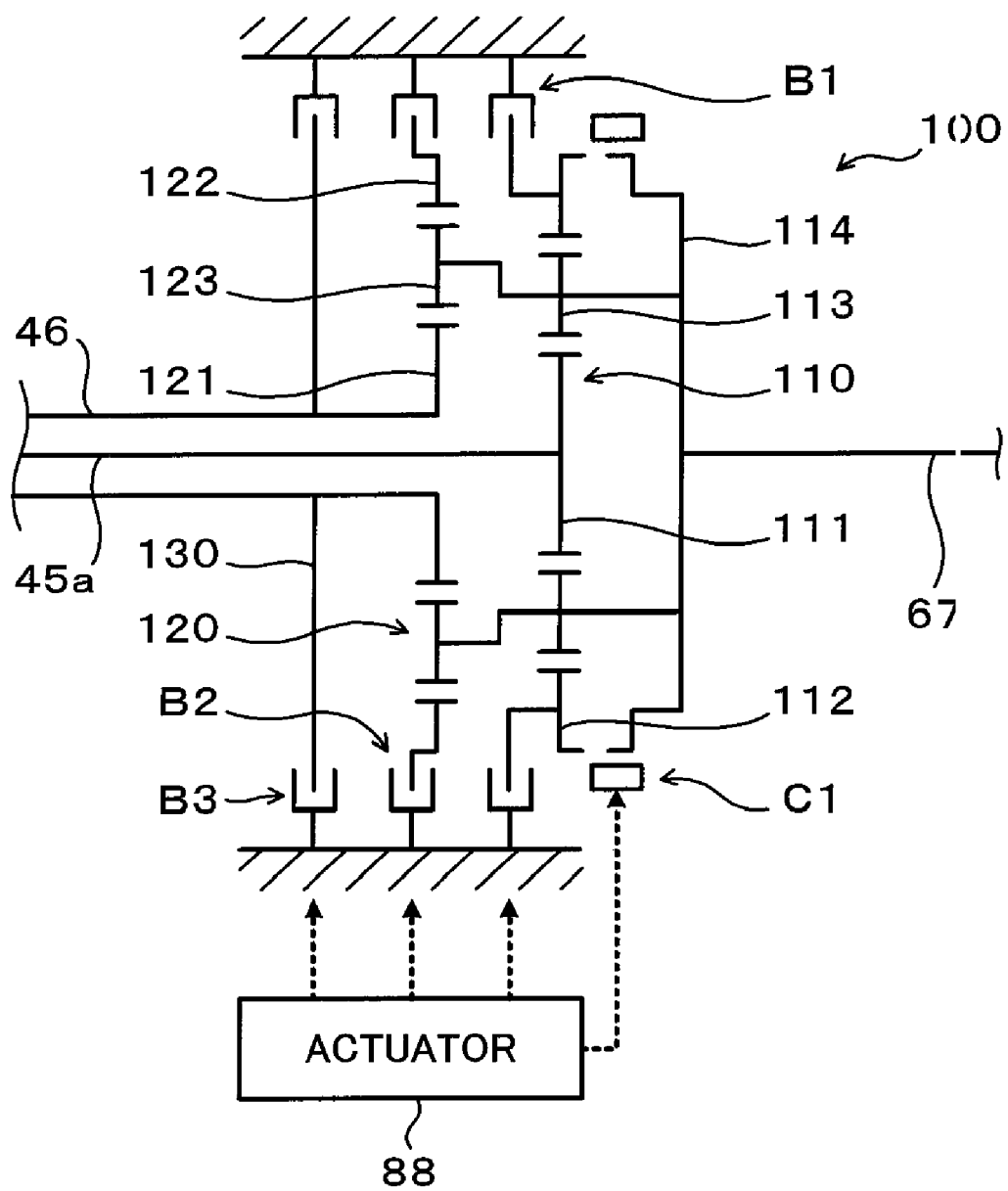
FIG. 18 is a schematic configuration view showing another transmission 100 which can be applied to the hybrid vehicle 20 of the present embodiment.

FIG. 18 is a schematic configuration view showing a planetary gear transmission 100 which can be applied to the hybrid vehicle 20 of the present embodiment. The transmission 100 shown in the same Figure can also set the speed ratio (speed state) at a plurality of stages; and includes a first transmission planetary gear mechanism 110 capable of coupling the carrier 45 (carrier shaft 45a) which is a first element of the power distribution and integration mechanism 40 to the drive shaft 67; a second transmission planetary gear mechanism 120 capable of coupling the first motor shaft 46 of the motor MG1 to the drive shaft 67; a brake B1 (first fixing mechanism) provided in the first transmission planetary gear mechanism 110; a brake B2 (second fixing mechanism) provided in the second transmission planetary gear mechanism 120; a brake B3 (third fixing mechanism); the clutch C1 (transmission connection/disconnection device), and the like. The first transmission planetary gear mechanism 110 and the brake B1 constitute the first transmission mechanism of the transmission 100; and the second transmission planetary gear mechanism 120 and the brake B2 constitute the second transmission mechanism of the transmission 100. As shown in FIG. 18, the first transmission planetary gear mechanism 110 is a single pinion planetary gear mechanism including a sun gear 111 connected to the carrier shaft 45a; a ring gear 112 which is an internal gear arranged concentrically with this sun gear 111; a carrier 114 having a plurality of pinion gears 113 which are meshed with both the sun gear 111 and the ring gear 112, as well as being connected to the drive shaft 67; and is configured such that the sun gear 111 (input element), the ring, gear 112 (fixable element), and the carrier 114 (output element) can be differentially rotated with respect to each other. In addition, the second transmission planetary gear mechanism 120 is a single pinion planetary gear mechanism including a sun gear 121 connected to the first motor shaft 46; a ring gear 122 which is an internal gear arranged concentrically with this sun gear 121; and a carrier 114 common to the first, transmission planetary gear mechanism 110 having a plurality of pinion gears 123 which are meshed with both the sun gear 121 and the ring gear 122; and is configured such that the sun gear 121 (input element), the ring gear 122 (fixable element), and the carrier 114 (output element) are differentially rotated with respect to each other. In the example of FIG. 18, the second transmission planetary gear mechanism 120 is arranged in parallel so as to be located coaxially and forward in the vehicle with respect to the first transmission planetary gear mechanism 110, and the gear ratio p2 (the number of teeth of the sun gear 121/the number of teeth of the ring gear 122) of the second transmission planetary gear mechanism 120 is set so as to be a little larger than the gear ratio (the number of teeth of the sun gear 111/the number of teeth of the ring gear 112) $\rho1$ of the first transmission planetary gear mechanism 110.

The brake B1 can non-rotatably fix the ring gear 112 of tae first transmission planetary gear mechanism 110 with respect to the transmission case and can release the ring gear 112 so as to be rotatable, and can be driven by the above described electric, electromagnetic, or hydraulic actuator 88. In addition, the brake B2 can non-rotatably fix the ring gear 122 of the second transmission planetary gear mechanism 120 with respect to the transmission case and can release the ring gear 122 so as to be rotatable; and can be driven by the actuator 88 in the same manner as for the brake B1. Further, the brake B3 can non-rotatably fix the first motor shaft 46, namely, the sun gear 41 which is a second element of the power distribution and integration mechanism 40 through the stator 130 fixed to the first motor shaft 46 with respect to the transmission case; can release the stator 130 to cause the first motor shaft 46 to be rotatable; and can be driven by the actuator 88 in the same manner as for the brakes B1 and B2. In addition, the clutch C1 can perform a connection and a disconnection between the carrier 114 which is an output element of first transmission planetary gear mechanism 110 and the ring gear 112 which is a fixable element; and can be driven by the actuator 88 in the same manner as for the brakes B1 to B3. The clutch C1 can be configured as, for example, a dog clutch which can mesh a dog fixed to the carrier 114 with a dog fixed to the ring gear 112 with less loss and can release the mesh therebetween. Then, power transmitted from the carrier 114 of the transmission 100 to the drive shaft 67 is finally outputted to the rear wheels 69a and 69b as the drive wheels through the differential gear 68. The transmission 100 configured as described above can reduce the axial and radial sizes, for example, in comparison with the parallel shaft-type transmission. Moreover, the first transmission planetary gear mechanism 110 and the second transmission planetary gear mechanism 120 can be located at a downstream side of and coaxially with the engine 22, the motors MG1 and MG2, and the power distribution and integration mechanism 40. Therefore, the use of the transmission 100 can simplify the shaft bearing and can reduce the number of shaft bearings.

Moreover, the transmission 100 can set the speed ratio at a plurality of stages as described below. That is, when the brake B1 is used to non-rotatably fix the ring gear 112 of the first transmission planetary gear mechanism 110 with respect to the transmission case, power from the carrier shaft 45a can be changed in speed at a speed ratio ($\rho1/(1+\rho1)$) based on the gear ratio $\rho1$ of the first transmission planetary gear mechanism 110 and can be transmitted to the drive shaft 67 (hereinafter, the state is referred to as a "first speed state (1st speed)"). Moreover, when the brake B2 is used to non-rotatably fix the ring gear 122 of the second transmission planetary gear mechanism 120 with respect to the transmission case, power from the first motor shaft 46 can be changed in speed at a speed ratio ($\rho2/(1+\rho2)$) based on the gear ratio $\rho2$ of the second transmission planetary gear mechanism 120 and can be transmitted to the drive shaft 67 (hereinafter, the state is referred to as a "second speed state (2nd speed)"). Further, when the clutch C1 is used to connect the carrier 114 and the ring gear 112 of the first transmission planetary gear mechanism 110, the sun gear 111, the ring gear 112, and the carrier 114 constituting the first transmission planetary gear mechanism 110 are substantially locked to rotate integrally, and thus, power from the carrier shaft 45a can be transmitted to the drive shaft 67 at a speed ratio of 1 (hereinafter, the state is referred to as a "third speed state (3rd speed)").

In addition, according to the transmission 100, the brake B1 fixes the ring gear 112, and the first transmission planetary gear mechanism 110 (first transmission mechanism) couples the carrier 45 of the power distribution and integration mechanism 40 to the drive shaft 67; in such a first speed state, when the ring gear 122 is fixed by the brake B2 constituting the second transmission mechanism, the first motor shaft 46 is also coupled to the drive shaft 67 by the second transmission planetary gear mechanism 120 (second transmission mechanism). Therefore, power from the engine 22 or power from at least one of the motors MG1 and MG2 can be mechanically (directly) transmitted to the drive shaft 67 at a fixed speed ratio (the state is referred to as a "1st-2nd speed simultaneous engagement state"). Moreover, in the second speed state in which the ring gear 122 of the second transmission planetary gear mechanism 120, which does not correspond to the clutch C1 which is a transmission connection/disconnection device is non-rotatably fixed, the clutch C1 is used to connect the carrier 114 which is an output element of the first transmission planetary gear mechanism 110 which corresponds to the clutch C1 and the ring gear 112 which is a fixable element thereof. Even by doing so, both the first motor shaft 46 and the carrier 45 can be coupled to the drive shaft 67. Then, power from the engine 22 or power from at least one of the motors MG1 and MG2 can be mechanically (directly) transmitted to the drive shaft 67 at a fixed speed ratio different from the above 1st-2nd speed simultaneous engagement state (the state is referred to as a "2nd-3rd speed simultaneous engagement state"). Further, in the third speed state in which the clutch C1 is used to connect the carrier 114 and the ring gear 112 of the first transmission planetary gear mechanism 110, when the brake B3 is used to non-rotatably fix the first motor shaft 46 namely, the sun gear 41 which is a second element of the power distribution and integration mechanism 40 with respect to the transmission case through the stator 130 fixed to the first motor shaft 46, the power from the engine 22 and the motor MG2 can be mechanically (directly) transmitted to the drive shaft 67 at a fixed speed ratio different from that of the above 1st-2nd speed simultaneous engagement state and the 2nd-3rd speed simultaneous engagement state (the state is referred to as a "3rd speed fixed state"). In addition, in the first speed state in which the brake B1 fixes the ring gear 112 and the first transmission planetary gear mechanism 110 couples the carrier 45 of the power distribution and integration mechanism 40 to the drive shaft 67, when the brake B3 is used to non-rotatably fix the first motor shaft 46, namely, the sun gear 41 which is a second element of the power distribution and integration mechanism 40 with respect to the transmission case through the stator 130 fixed to the first motor shaft 46, the power from the engine 22 and the motor MG2 can be mechanically (directly) transmitted to the drive shaft 67 at a fixed speed ratio different from that of the above 1st-2nd speed simultaneous engagement state, the 2nd-3rd speed simultaneous engagement state and 3rd speed fixed state (the state is referred to as a "1st speed fixed state"). As described above, the use of the planetary gear transmission 100 can provide advantages similar to the use of the parallel shaft-type transmission 60.

Figure 19:
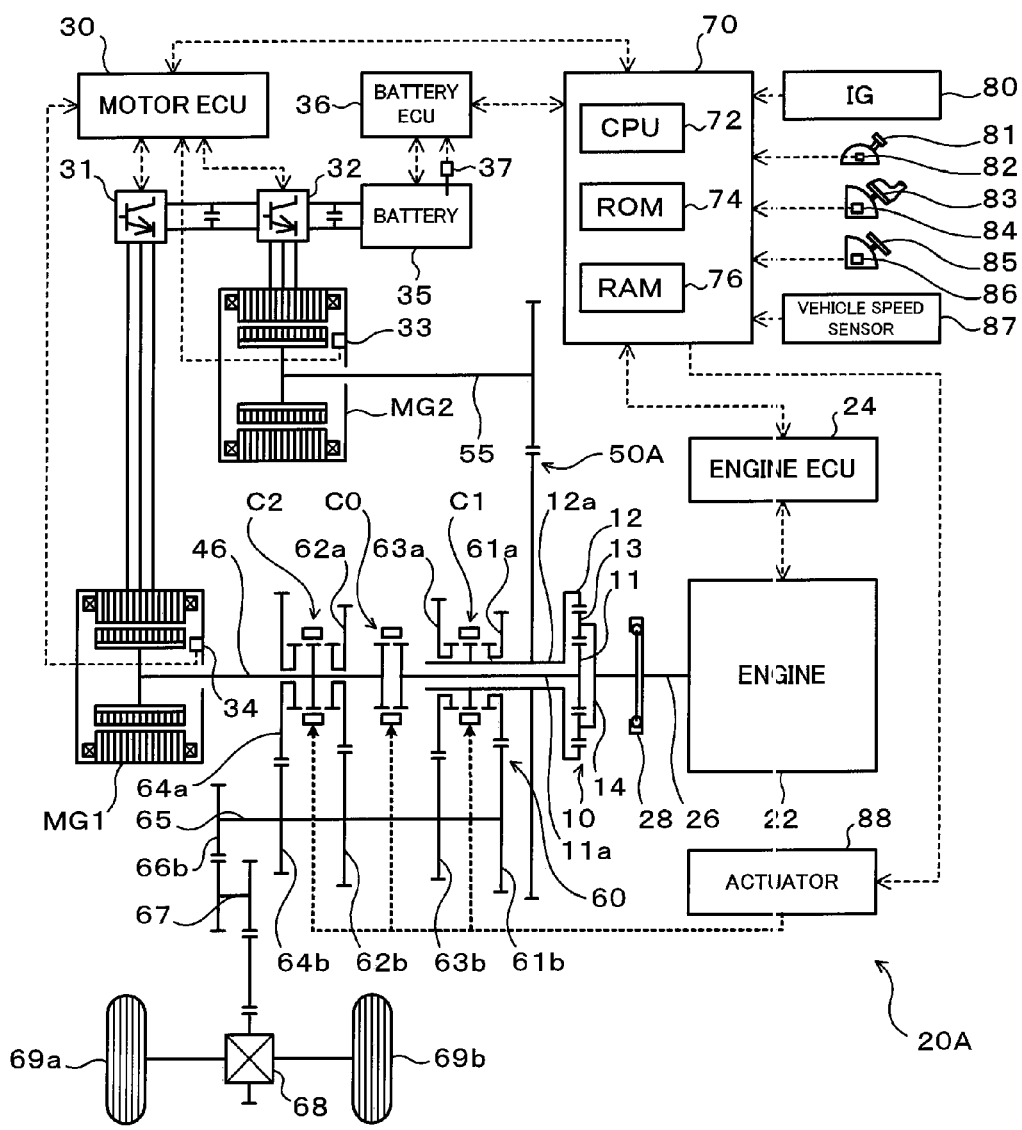
FIG. 19 is a schematic configuration view of a hybrid vehicle 20A which is a variation of the present embodiment.

FIG. 19 is a schematic configuration view of the hybrid vehicle 20A of a variation of the present embodiment. While the above described hybrid vehicle 20 is configured as a rear-wheel-drive vehicle, the hybrid vehicle 20A which is a variation thereof is configured as a front-wheel-drive vehicle. As shown in FIG. 19, the hybrid vehicle 20A has a power distribution and integration mechanism 10 which is a single pinion planetary gear mechanism including the sun gear 11; the ring gear 12 arranged concentrically with the sun gear 11; and the carrier 14 having plurality of pinion gears 13 which are meshed with the sun gear 11 and the ring gear 12. In this case, the engine 22 is arranged transversely, and the crankshaft 26 of the engine 22 is connected to the carrier 14 which is a third element of the power distribution and integration mechanism 10. Moreover, the hollow ring gear shaft 12a is connected to the ring gear 12 which is a first element of the power distribution and integration mechanism 10, and the motor MG2 is connected to the ring gear shaft 12a through the reduction gear mechanism 50A which is a parallel shaft-type gear train and the second motor shaft 55 which extends in parallel to the first motor shaft 46. Moreover, the clutch C1 can be used to selectively fix one of the first speed gear train (gear 61a) and the third speed gear train (gear 63a) which constitute the first transmission mechanism of the transmission 60 to the ring gear shaft 12a. Further, the sun gear shaft 11a is connected to the sun gear 11 which is a second element of the power distribution and integration mechanism 10, the sun gear shaft 11a is connected to the clutch C0 through the hollow ring gear shaft 12a, and can be connected to the first motor shaft 46, namely, the motor MG1 by the clutch C0. Then, the clutch C2 can be used to selectively fix one of the second speed gear train (gear 62a) and the forth speed gear train (gear 64a) which constitute the second transmission mechanism of the transmission 60 to the first motor shaft 46. As described above, the hybrid vehicle in accordance with the present invention may be configured as a front-wheel-drive vehicle.

Hereinbefore, the embodiments of the present invention have been described with reference to drawings, but the present invention is not limited to the above embodiments. It will be apparent that various modifications can be made to the present invention without departing from the spirit and scope of the present invention.

That is, according to the above embodiments, the clutch C0 is provided between the sun gear 41 which is a second element of the power distribution and integration mechanism 40 and the motor MG1 as a second motor and is configured to perform a connection and a disconnection therebetween, but the clutch C0 may be provided between the carrier 45 which is a first element of the power distribution and integration mechanism 40 and the motor MG2 as a first motor and may be configured to perform a connection and a disconnection therebetween. Alternatively, the clutch C0 may be provided between the ring gear 42 which is a third element of the power distribution and integration mechanism 40 and the crankshaft 26 of the engine 22 and may be configured to perform a connection and a disconnection therebetween. Moreover, the power distribution and integration mechanism provided in the above hybrid vehicle 20 may be a planetary gear mechanism including a first sun gear and a second sun gear having a mutually different number of teeth; and a carrier having at least one stepped gear configured by coupling a first pinion gear meshed with the first sun gear and a second pinion gear meshed with the second sun gear. Further the power distribution and integration mechanism provided in the hybrid vehicle 20 may be a single pinion planetary gear mechanism including a sun gear, a ring gear, and a carrier having at least one pinion gear meshed with both the sun gear and the ring gear. In addition, the above hybrid vehicles 20 and 20A may be configured as a rear-wheel-drive based or front-wheel-drive based four-wheel-drive vehicle. In addition, in the above embodiments, the power output apparatus has been described as being mounted on the hybrid vehicles 20 and 20A, but the power output apparatus in accordance with the present invention may be mounted on a vehicle other than a car, and a mobile body such as vessel and aircraft, and may also be installed in fixed equipment such as construction equipment.

INDUSTRIAL APPLICABILITY

The present invention can be used in a manufacturing industry of a power output apparatus, a hybrid vehicle and the like.

The invention claimed is:

1. A power output, apparatus for outputting power to a drive shaft, said power output apparatus comprising:
   an internal combustion engine;
   a first motor capable of inputting and outputting power;
   a second motor capable of inputting and outputting power;
   an accumulator capable of sending and receiving power to and from each of said first and second motors;
   a power distribution and integration mechanism having a first element connected to a rotating shaft of said first motor; a second element connected to a rotating shaft of said second motor; a third element connected to an engine shaft of said internal combustion engine, said power distribution and integration mechanism being configured so that these three elements can be differentially rotated with respect to each other;
   a connection/disconnection device capable of performing a drive source element connection being any one of a connection between said first motor and said first element, a connection between said second motor and said second element, and a connection between said internal combustion engine and said third element, said connection/disconnection device capable of performing a release of said drive source element connection;
   a transmission mechanism capable of selectively coupling one or both of said rotating shaft of said first motor and said rotating shaft of said second motor to said drive shaft, and transmitting power from said first motor and power from said second motor to said drive shaft at a predetermined speed ratio respectively;
   a power demand setting module for setting a power demand which is power required for said drive shaft; and
   a control module for controlling said first and second motors, said connection/disconnection device, and said transmission mechanism so that power based on said set power demand is outputted to said drive shaft while performing a power transfer process of transferring power from one of said first and second motors to the other, a release of the coupling between one of said first and second motors and said drive shaft by said transmission mechanism, a rotation speed adjusting process of adjusting a rotation speed of one of said first and second motors released from the coupling to said drive shaft so as to enable said drive source element connection, said drive source element connection, and an engine start process of cranking said internal combustion engine by said first or second motor, if an engine start condition for starting said internal combustion engine is established when said transmission mechanism couples both said first and second motors to said drive shaft and at least one of said first and second motors outputs power in a state in which said drive source element connection is released and said internal combustion engine is stopped.

2. A power output apparatus according to claim 1, wherein said power transfer process is a process of decreasing power from one of said first and second motors and increasing power from the other one of said first and second motors so that at a time when a predetermined transfer time has elapsed since said power transfer process started, power outputted from one of said first and second motors, becomes a value of 0 and power outputted from the other of said first and second motors becomes a value based on said power demand and a target speed ratio which is a speed ratio of said transmission mechanism after a coupling between one of said first and second motors and said drive shaft is released.

3. A power output apparatus according to claim 2, wherein said power transfer process is a process of setting a torque command to said first motor and second motor based on power outputted from said first and second motors, a power demand set by said power demand setting module and said target speed ratio so that power based on a power demand is always outputted to said drive shaft during an execution of said power transfer process and the power transfer is completed within said transfer time.

4. A power output apparatus according to claim 2, wherein said power transfer process is a process of setting a torque command to said first and second motors based on power outputted from said first and second motors when said power transfer process starts, said power demand and said target speed ratio at the start time of said power transfer process so that the power transfer is completed within said transfer time.

5. A power output apparatus according to claim 1, wherein said rotation speed adjustment process is a process of synchronizing a rotation speed of said first or second motor which is released from a coupling to said drive shaft with a rotation speed of said first or second element under said drive source element connection based on a rotation speed of said second or first motor which is coupled to said drive shaft.

6. A power output apparatus according to claim 1, wherein said transmission mechanism is a parallel shaft-type transmission including: a first transmission mechanism having at least one parallel shaft-type gear train capable of coupling one of said first and second elements of said power distribution and integration mechanism to said drive shaft; and a second transmission mechanism having at least one parallel shaft-type gear train capable of coupling a rotating shaft of said first or second motor which corresponds to the other one of said first and second elements to said drive shaft.

7. A power output apparatus according to claim 1, wherein said transmission mechanism is a planetary gear transmission including a first transmission planetary gear mechanism having an input element connected to one of said first and second elements of said power distribution and integration mechanism, an output element connected to said drive shaft, and a fixable element, said first transmission planetary gear mechanism being configured so that these three elements can be differentially rotated with respect to each other; a first fixing mechanism capable of non-rotatably fixing said fixable element of said first transmission planetary gear mechanism; a second transmission planetary gear mechanism having an input element connected to a rotating shaft of said first or second motor which corresponds to the other of said first and second elements, and an output element connected to said drive shaft, and a fixable element, said second transmission planetary gear mechanism being configured so that these three elements can be differentially rotated with respect to each other; and a second fixing mechanism capable of non-rotatably fixing said fixable element of said second transmission planetary gear mechanism.

8. A power output apparatus according to claim 7, wherein said transmission mechanism further including a transmission connection/disconnection device capable of performing a connection and a disconnection between said output element of one of said first transmission planetary gear mechanism and said second transmission planetary gear mechanism and said fixable element.

9. A hybrid vehicle including a drive wheel driven by power from a drive shaft, said hybrid vehicle comprising:
an internal combustion engine;
a first motor capable of inputting and outputting power;
a second motor capable of inputting and outputting power;
an accumulator capable of sending and receiving power to and from each of said first and second motors;
a power distribution and integration mechanism having a first element connected to a rotating shaft of said first motor; a second element connected to a rotating shaft of said second motor; a third element connected to an engine shaft of said internal combustion engine, said power distribution and integration mechanism being configured so that these three elements can be differentially rotated with respect to each other;
a connection/disconnection device capable of performing a drive source element connection being any one of a connection between said first motor and said first element, a connection between said second motor and said second element, and a connection between said internal combustion engine and said third element, said connection/disconnection device capable of performing a release of said drive source element connection;
a transmission mechanism capable of selectively coupling one or both of said rotating shaft of said first motor and said rotating shaft of said second motor to said drive shaft, and transmitting power from said first motor and power from said second motor to said drive shaft at a predetermined speed ratio respectively;
a power demand setting module for setting a power demand which is power required for said drive shaft; and
a control module for controlling said first and second motors, said connection/disconnection device, and said transmission mechanism so that power based on said set power demand is outputted to said drive shaft while performing a power transfer process of transferring power from one of said first and second motors to the other, a release of the coupling between one of said first and second motors and said drive shaft by said transmission mechanism, a rotation speed adjusting process of adjusting a rotation speed of one of said first and second motors released from the coupling to said drive shaft so as to enable said drive source element connection, said drive source element connection, and an engine start process of cranking said internal combustion engine by said first or second motor, if an engine start condition for starting said internal combustion engine is established, when said transmission mechanism couples both said first and second motors to said drive shaft and at least one of said first and second motors outputs power in a state in which said drive source element connection is released and said internal combustion engine is stopped.

10. A method of controlling a power output apparatus comprising: a drive shaft; an internal combustion engine; a first motor and a second motor capable of inputting and outputting power respectively; an accumulator capable of sending and receiving power to and from each of said first and second motors; a power distribution and integration mechanism having a first element connected to a rotating shaft of said first motor; a second element connected to a rotating shaft of said second motor; a third element connected to an engine shaft of said internal combustion engine, said power distribution and integration mechanism being configured so that these three elements can be differentially rotated with respect to each other; a connection/disconnection device capable of performing a drive source element connection being any one of a connection between said first motor and said first element, a connection between said second motor and said second element, and a connection between said internal combustion engine and said third element, said connection/disconnection device capable of performing a release of said drive source element connection; a transmission mechanism capable of selectively coupling one or both of said rotating shaft of said first motor and said rotating shaft of said second motor to said drive shaft, and transmitting power from said first motor and power from said second motor to said drive shaft at a predetermined speed ratio respectively; said control method comprising steps of:
(a) transferring power from one of said first and second motors to the other, if an engine start condition for starting said internal combustion engine is established when said transmission mechanism couples both said first and second motors to said drive shaft and at least one of said first and second motors outputs power in a state in which said drive source element connection is released and said internal combustion engine is stopped;
(b) releasing the coupling between one of said first and second motors and said drive shaft by said transmission mechanism;
(c) adjusting a rotation speed of one of said first and second motors released from the coupling to said drive shaft so as to enable said drive source element connection;
(d) executing said drive source element connection; and
(e) starting said internal combustion engine with cranking by said first or second motor.

11. A method of controlling the power output apparatus according to claim 10 further comprising step of:
setting a torque command to said first and second motors so that power based on a power demand required for said drive shaft is outputted during the execution of steps (a) to (e).

12. A method of controlling the power output apparatus according to claim 10, wherein the step (a) decreases power from one of said first and second motors and increases power from the other one of said first and second motors so that at a time when a predetermined transfer time has, elapsed since its start, power outputted from one of said first and second motors becomes a value of 0 and power outputted from the other of said first and second motors becomes a value based on said power demand and a target speed ratio which is a speed ratio of said transmission mechanism after a coupling between one of said first and second motors and said drive shaft is released.

13. A method of controlling the power output apparatus according to claim 12, wherein the step (a) sets a torque command to said first and second motors based on power outputted from said first and second motors, said power demand and said target speed ratio so that power based on a power demand is always outputted to said drive shaft during an execution of said power transfer process and the power transfer is completed within said transfer time.

14. A method of controlling the power output apparatus according to claim 12, wherein the step (a) sets a torque command to said first and second motors based on power outputted from said first and second motors at the start time of the step (a), said power demand at said start time and said target speed ratio so that the power transfer is completed within said transfer time.

15. A method of controlling the power output apparatus according to claim 10, wherein the step (c) synchronizes a rotation speed of said first or second motor which is released from a coupling to said drive shaft with a rotation speed of said first or second element under said drive source element connection based on a rotation speed of said second or first motor which is coupled to said drive shaft.

* * * * *

UNITED STATES PATENT AND TRADEMARK OFFICE
CERTIFICATE OF CORRECTION

PATENT NO. : 8,100,207 B2
APPLICATION NO. : 12/444024
DATED : January 24, 2012
INVENTOR(S) : Hidehiro Oba et al.

Page 1 of 1

It is certified that error appears in the above-identified patent and that said Letters Patent is hereby corrected as shown below:

| Column | Line | |
|--------|------|---|
| 7 | 1 | After "at" delete ",". |
| 8 | 16 | After "generatable" delete ",". |
| 9 | 5 | After "MG2" delete ",". |
| 9 | 6 | After "of" delete ",". |
| 9 | 9 | Change "(battery ECU)" to --"battery ECU"--. |
| 9 | 64 | After "or" delete ",". |
| 13 | 42 | Change "Various" to --various--. |
| 14 | 49 | After "engine" insert --22--. |
| 14 | 55 | After "in" delete ",". |
| 15 | 55 | Change "Continuously" to --continuously--. |
| 16 | 35 | Change "Motor" to --motor--. |
| 16 | 38 | Change "Moreover; as" to --Moreover, as--. |
| 18 | 54 | After "hybrid vehicle" insert --20--. |
| 21 | 51 | After "output"" delete ",". |
| 22 | 36 | After "motor" delete ",". |
| 25 | 38 | Change "22: Therefore" to --22. Therefore--. |
| 28 | 56 | Change "Started" to --started--. |
| 29 | 65 | Change "gear ratio p2" to --gear ratio ρ2--. |
| 31 | 16 | After "120" delete ",". |
| 36 | 56 | After "has" delete ",". |

Signed and Sealed this
Fifteenth Day of January, 2013

David J. Kappos
*Director of the United States Patent and Trademark Office*